(12) United States Patent
Hooper et al.

(10) Patent No.: US 10,814,369 B2
(45) Date of Patent: Oct. 27, 2020

(54) ARCHITECTURAL MANUFACTURES, APPARATUS AND METHODS USING ADDITIVE MANUFACTURING TECHNIQUES

(71) Applicant: Alcoa Inc., Pittsburgh, PA (US)

(72) Inventors: William J. Hooper, Lawrenceville, GA (US); Joshua Tuminella, Atlanta, GA (US); Ion-Horatiu Barbulescu, Atlanta, GA (US); Matthew M. Miller, Dunwoody, GA (US); Kyle A. McDaniel, Johns Creek, GA (US)

(73) Assignee: ARCONIC TECHNOLOGIES LLC, Pittsburgh, PA (US)

( * ) Notice: Subject to any disclaimer, the term of this patent is extended or adjusted under 35 U.S.C. 154(b) by 341 days.

(21) Appl. No.: 15/229,362

(22) Filed: Aug. 5, 2016

(65) Prior Publication Data

US 2017/0037674 A1    Feb. 9, 2017

Related U.S. Application Data

(60) Provisional application No. 62/202,605, filed on Aug. 7, 2015.

(51) Int. Cl.
*E06B 3/26* (2006.01)
*B33Y 10/00* (2015.01)
(Continued)

(52) U.S. Cl.
CPC .......... *B21C 23/142* (2013.01); *B22F 3/1055* (2013.01); *B22F 5/10* (2013.01);
(Continued)

(58) Field of Classification Search
CPC .......... E06B 3/2605; E06B 3/263; E06B 3/20; E06B 3/12; E06B 3/273; E06B 3/26343;
(Continued)

(56) References Cited

U.S. PATENT DOCUMENTS 5,340,433 A   8/1994  Crump
7,887,316 B2  2/2011  Cox
(Continued)

FOREIGN PATENT DOCUMENTS

CA    2928832      5/2015
CN    203592802    5/2014
(Continued)

OTHER PUBLICATIONS

International Search Report and Written Opinion dated Nov. 7, 2016 in regard to International Application No. PCT/US2016/045716, filed Aug. 5, 2016.
(Continued)

*Primary Examiner* — Ziaul Karim
(74) *Attorney, Agent, or Firm* — Greenberg Traurig, LLP

(57) ABSTRACT

An apparatus, method and manufacture utilizes additive manufacturing techniques to produce architectural manufactures such as windows and doors. The manufactures may have a composite construction and may feature inclusions like metal plates and reinforcements. The model used for controlling the manufacturing process may be derived from digital scanning of the structure on which the manufacture is used. Optionally, a finite element analysis is used to test the model and alter it in response to stress and/or thermal requirements.

39 Claims, 23 Drawing Sheets

(51) Int. Cl.

| | |
|---|---|
| *B33Y 80/00* | (2015.01) |
| *B22F 3/105* | (2006.01) |
| *B23K 26/342* | (2014.01) |
| *E06B 3/263* | (2006.01) |
| *E06B 3/273* | (2006.01) |
| *E06B 3/20* | (2006.01) |
| *E06B 3/12* | (2006.01) |
| *B29C 64/129* | (2017.01) |
| *B22F 7/06* | (2006.01) |
| *B22F 5/10* | (2006.01) |
| *B21C 23/14* | (2006.01) |
| *B33Y 50/02* | (2015.01) |
| *B29K 105/00* | (2006.01) |
| *B29K 55/02* | (2006.01) |
| *B29K 75/00* | (2006.01) |
| *B29K 105/04* | (2006.01) |
| *B29C 64/386* | (2017.01) |

(52) U.S. Cl.
CPC .............. *B22F 7/06* (2013.01); *B23K 26/342* (2015.10); *B29C 64/129* (2017.08); *B33Y 10/00* (2014.12); *B33Y 80/00* (2014.12); *E06B 3/12* (2013.01); *E06B 3/20* (2013.01); *E06B 3/263* (2013.01); *E06B 3/2605* (2013.01); *E06B 3/26301* (2013.01); *E06B 3/26343* (2013.01); *E06B 3/273* (2013.01); *B22F 2003/1056* (2013.01); *B22F 2998/10* (2013.01); *B29K 2055/02* (2013.01); *B29K 2075/00* (2013.01); *B29K 2105/0067* (2013.01); *B29K 2105/04* (2013.01); *B33Y 50/02* (2014.12); *E06B 2003/2615* (2013.01); *Y02P 10/295* (2015.11)

(58) Field of Classification Search
CPC ......... E06B 3/26301; E06B 2003/2615; B21C 23/142; B23K 26/342; B33Y 80/00; B33Y 10/00; B33Y 50/02; Y02P 10/295; B22F 5/10; B22F 7/06; B22F 3/1055; B22F 2998/10; B22F 2003/1056; B29C 64/129; B29C 64/386; B29K 2055/02; B29K 2075/00; B29K 2105/0067; B29K 2105/04
USPC .......................................................... 700/98
See application file for complete search history.

(56) References Cited

U.S. PATENT DOCUMENTS

| | | |
|---|---|---|
| 8,874,248 B2 | 10/2014 | Young et al. |
| 8,883,392 B2 | 11/2014 | Napadensky et al. |
| 8,961,167 B2 | 2/2015 | Swanson et al. |
| 2001/0047251 A1 | 11/2001 | Kemp |
| 2002/0029533 A1* | 3/2002 | Davidsaver ........... E06B 3/5892 52/204.1 |
| 2004/0108040 A1* | 6/2004 | Field .................... B29C 66/324 156/73.6 |
| 2005/0280185 A1 | 12/2005 | Russell et al. |
| 2007/0075461 A1 | 4/2007 | Hunter et al. |
| 2009/0138113 A1* | 5/2009 | Hoguet ................ G06F 17/5004 700/98 |
| 2009/0229135 A1* | 9/2009 | Gilliam ..................... B27F 5/10 33/197 |
| 2010/0180528 A1 | 7/2010 | Shaw |
| 2012/0232857 A1 | 9/2012 | Fisker et al. |
| 2013/0185026 A1* | 7/2013 | Vanker ................ G06F 17/5004 703/1 |
| 2013/0211795 A1* | 8/2013 | Vanker ................ G06F 17/5004 703/1 |
| 2013/0295338 A1 | 11/2013 | Keating et al. |
| 2014/0107823 A1 | 4/2014 | Huang |
| 2014/0279177 A1 | 9/2014 | Stump |
| 2015/0035198 A1 | 2/2015 | Saba |
| 2015/0054195 A1 | 2/2015 | Greyf |
| 2016/0012160 A1* | 1/2016 | Mohacsi ............. G06F 17/5004 703/1 |
| 2016/0350827 A1* | 12/2016 | Lee ....................... G06Q 50/184 |

FOREIGN PATENT DOCUMENTS

| | | |
|---|---|---|
| CN | 104149345 | 11/2014 |
| CN | 204451340 | 7/2015 |
| WO | 2012104406 | 8/2012 |
| WO | 2014127426 | 8/2014 |

OTHER PUBLICATIONS

Peli Design, A Machine's Perception Handles, http://pelidesign.com/websitepelo/a-machines-perception/#3, Retrieved Jul. 7, 2017.
DWM Magazine, "Window companies utilize 3D printing technology | DWM Magazine", Aug. 4, 2014 (Aug. 4, 2014), XP055513796, retrieved from the internet: https://www.dwmmag.com/window-companies-utilized-3d-printing-technology/ (retrieved Sep. 10, 2018).

* cited by examiner

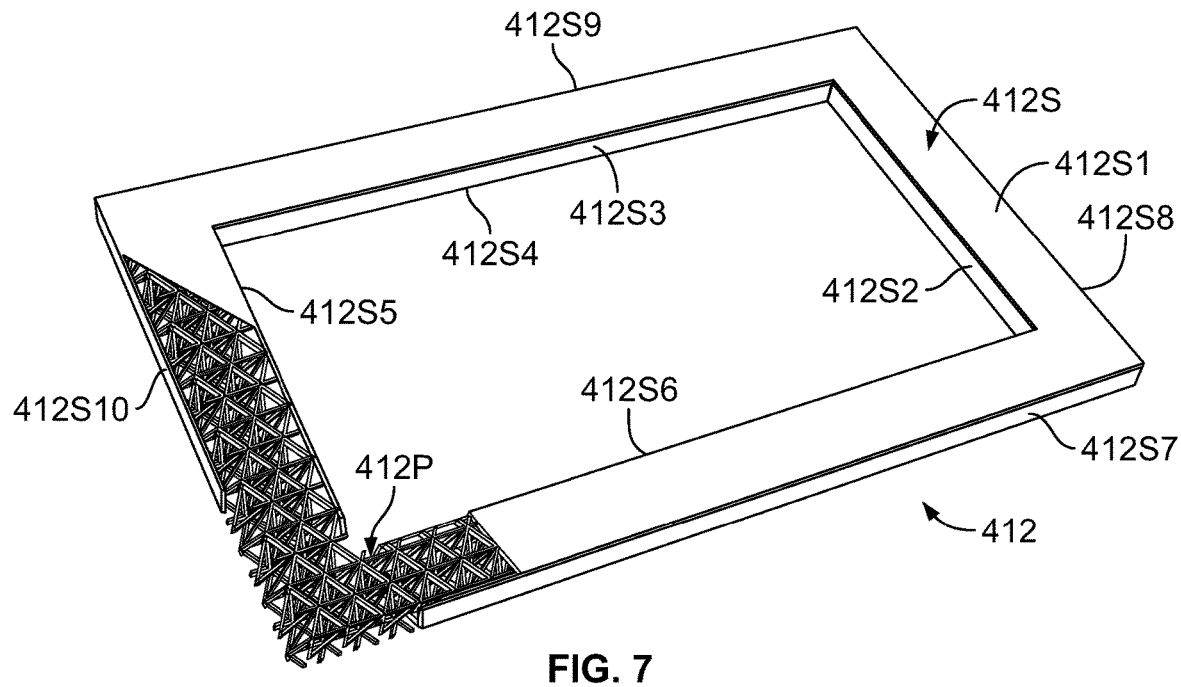
FIG. 7
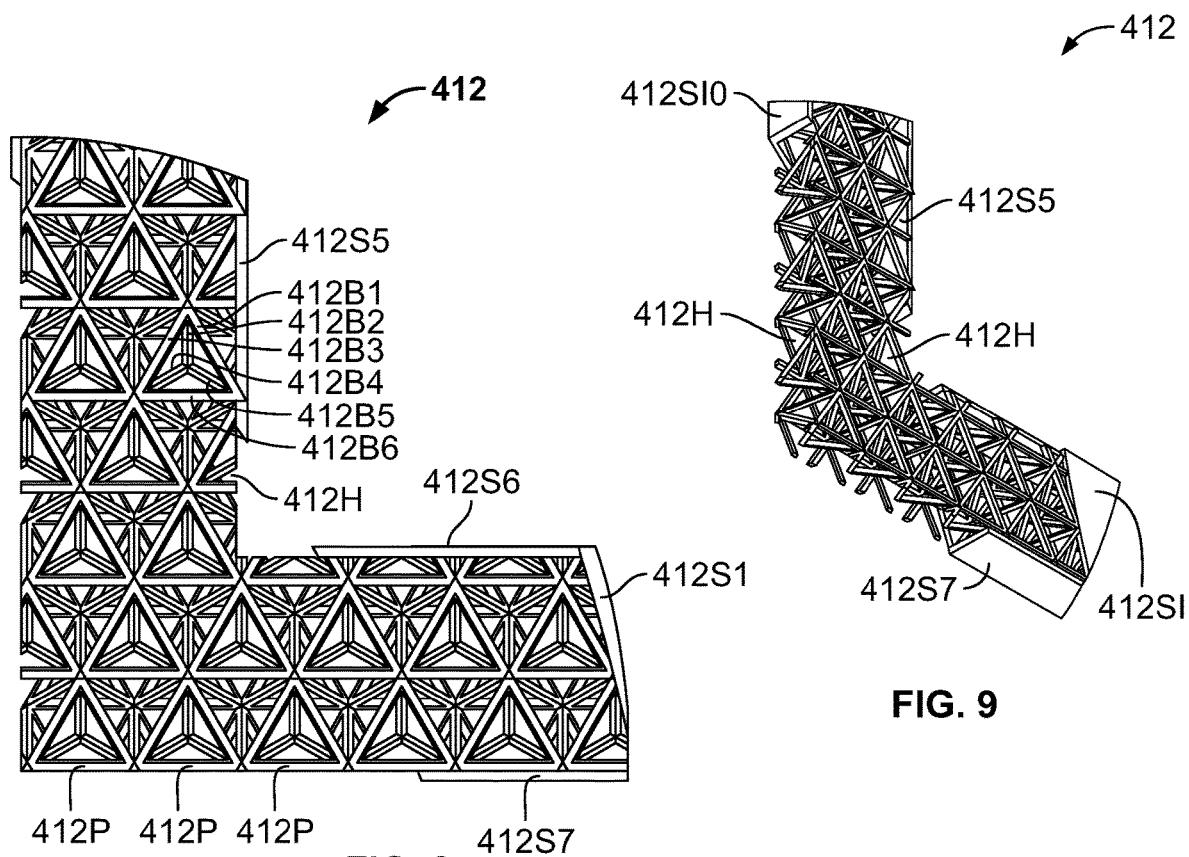
FIG. 8
FIG. 9

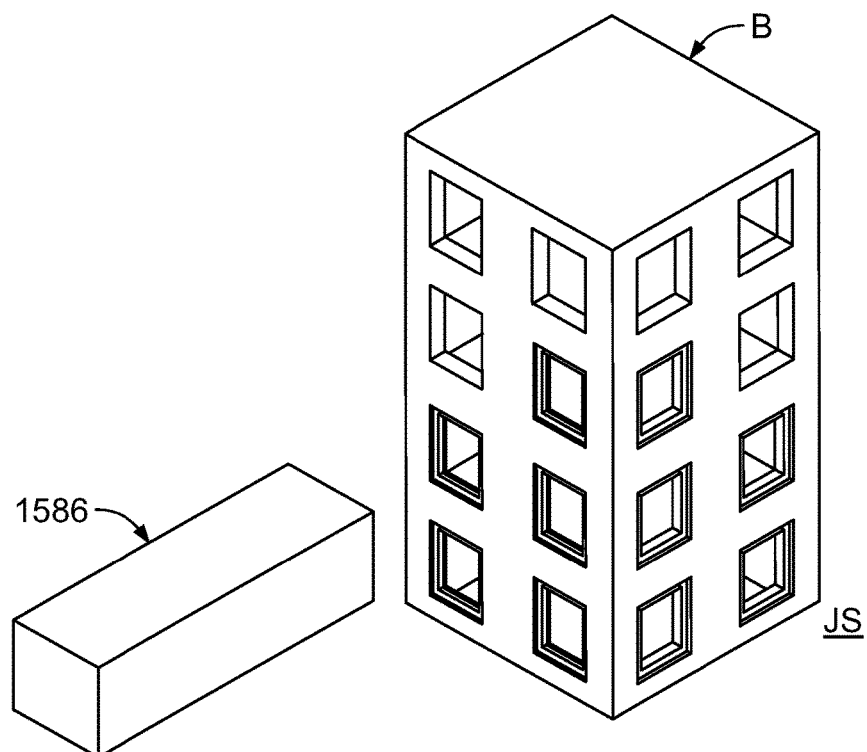
FIG. 27
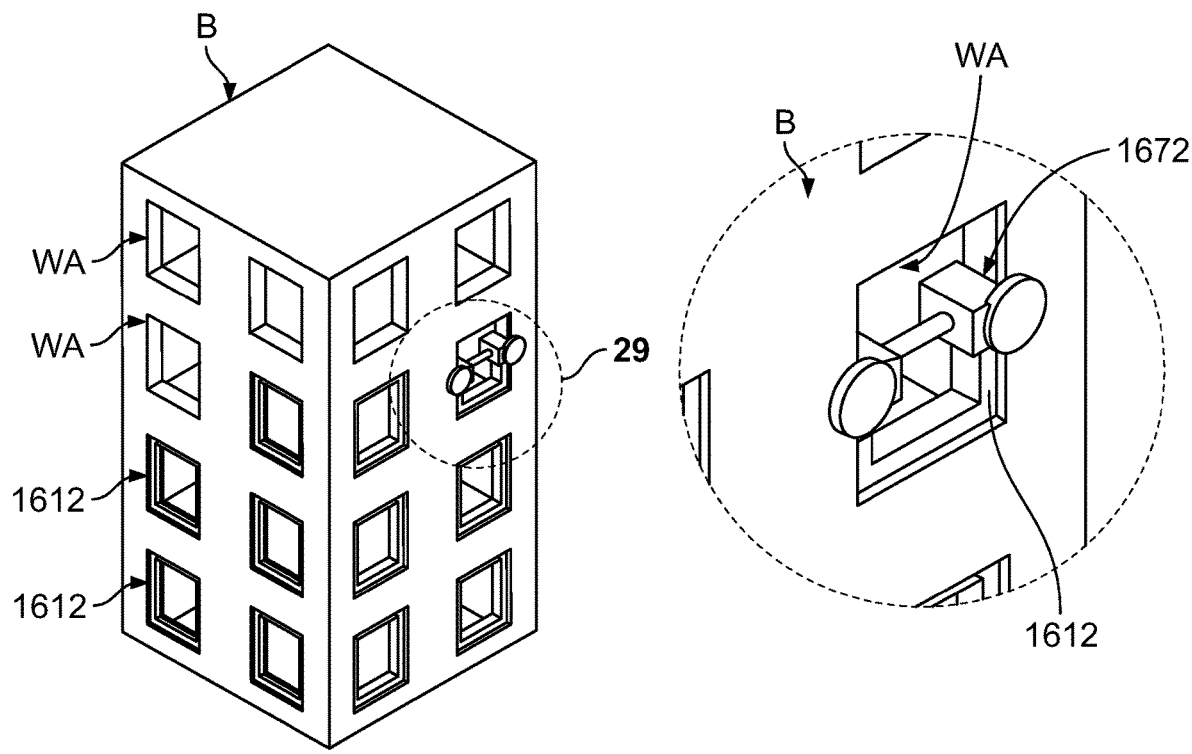
FIG. 28  FIG. 29

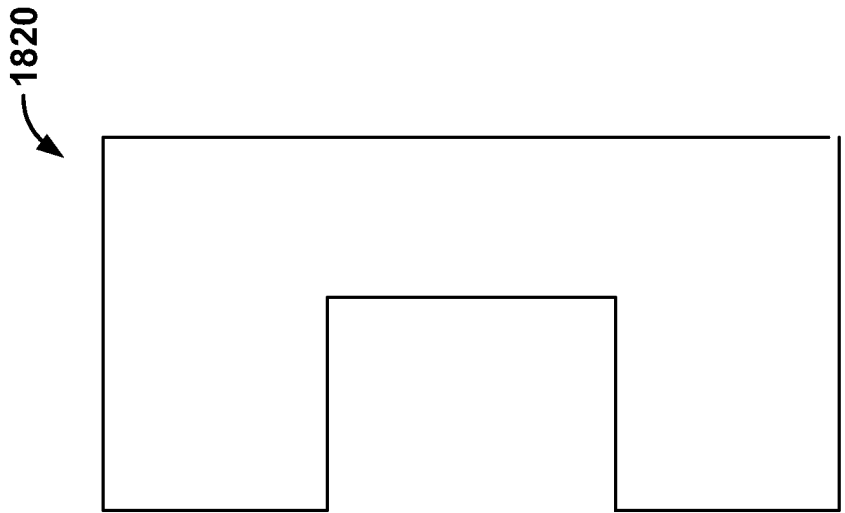
FIG. 33
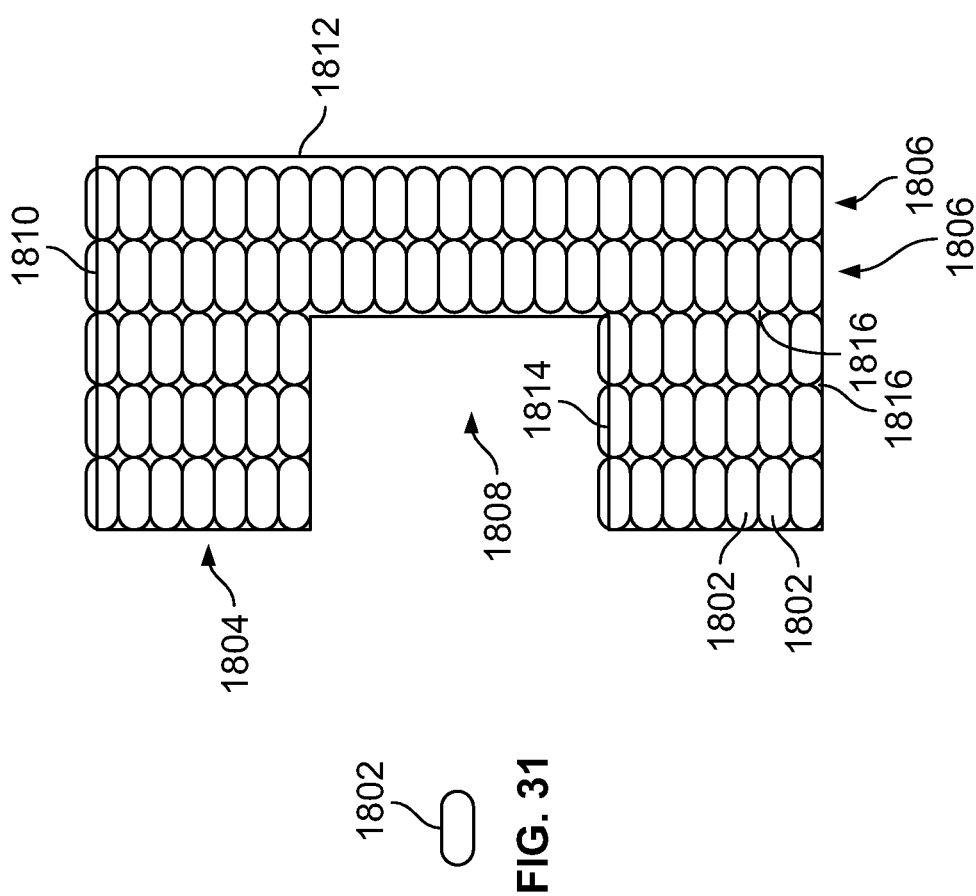
FIG. 32
FIG. 31

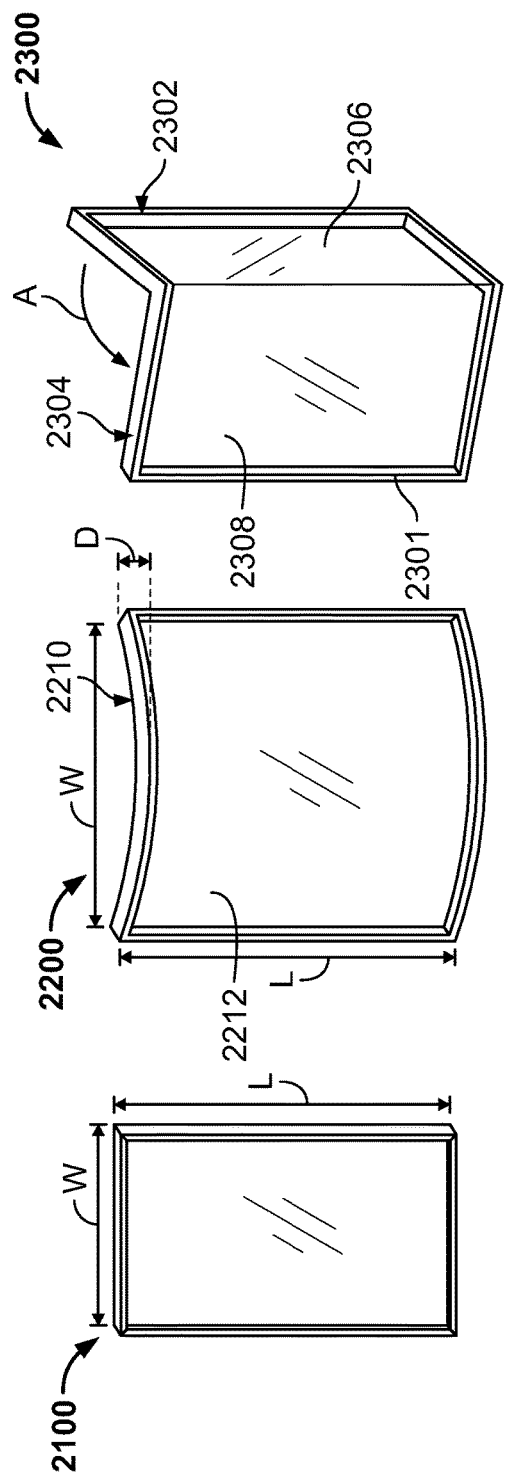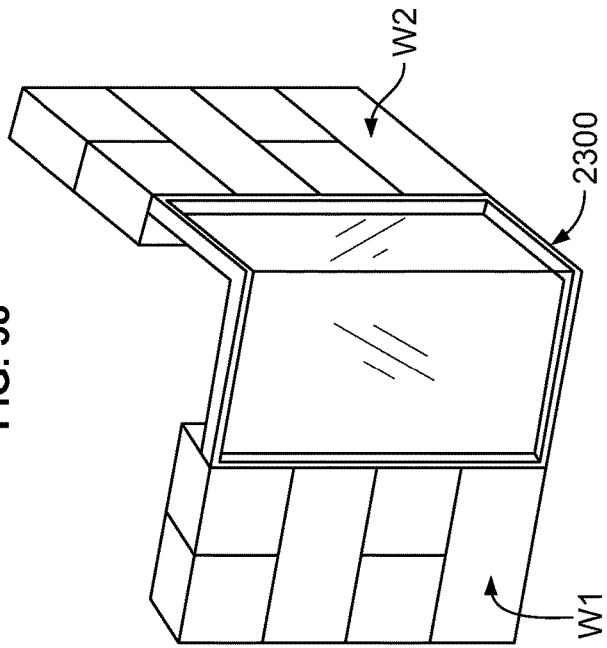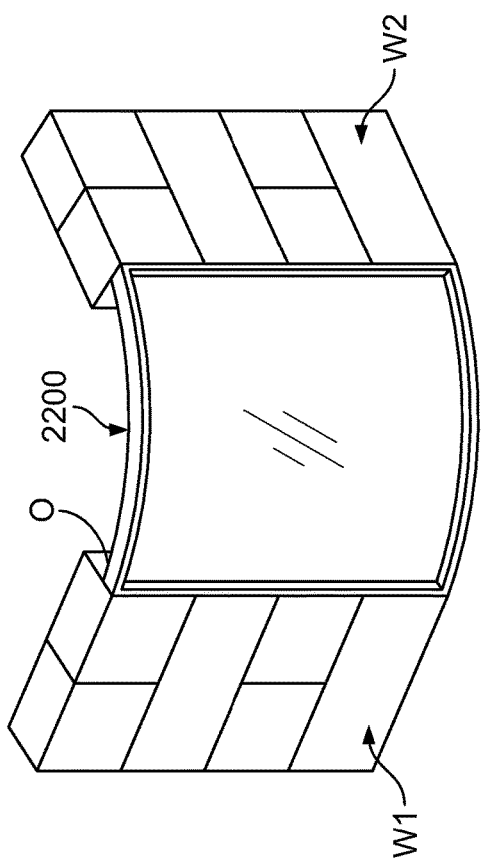

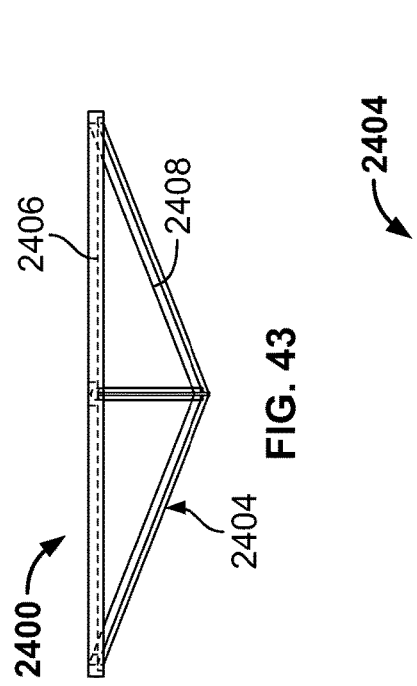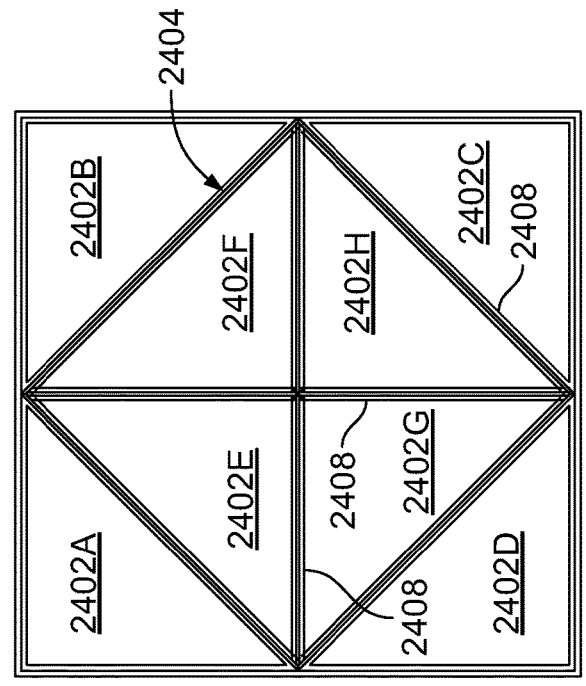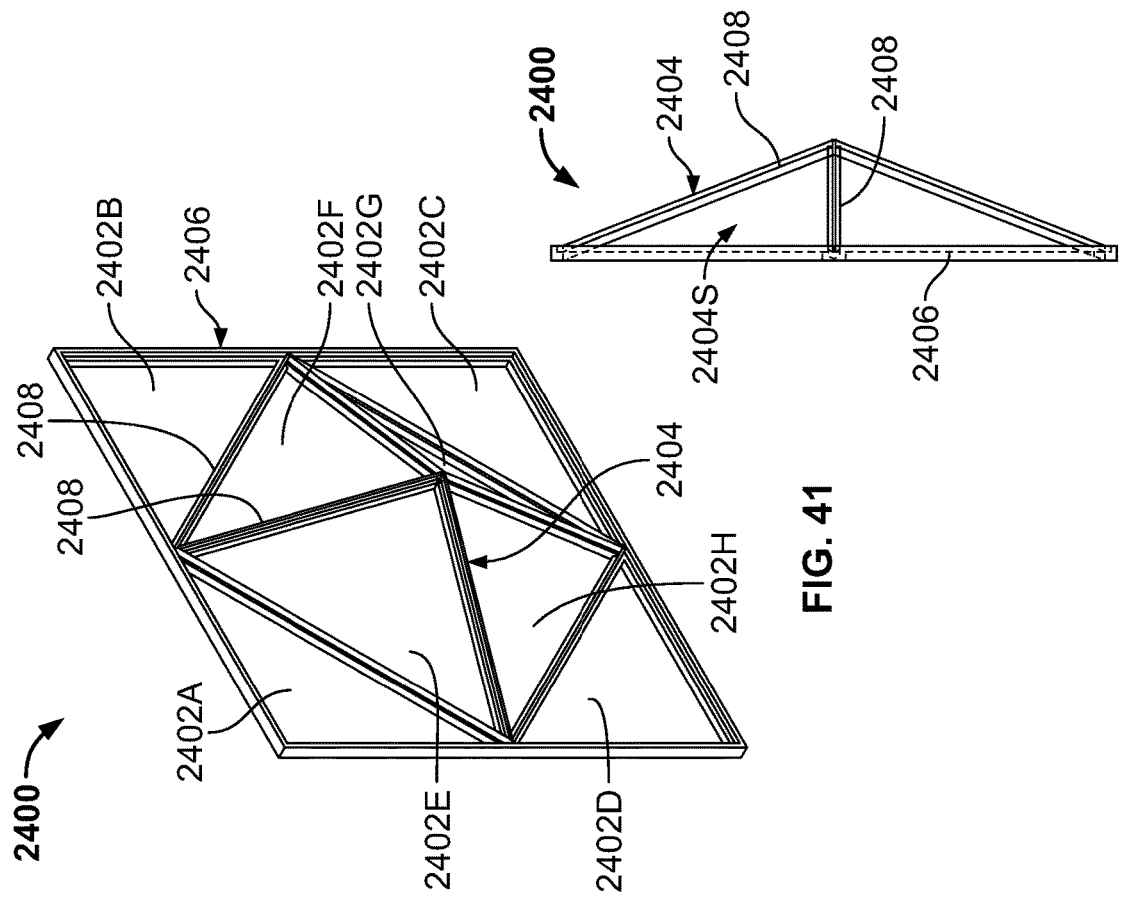

ARCHITECTURAL MANUFACTURES, APPARATUS AND METHODS USING ADDITIVE MANUFACTURING TECHNIQUES

CROSS REFERENCE TO RELATED APPLICATIONS

The present application claims the benefit of U.S. Provisional Application No. 62/202,605, entitled, Architectural Manufactures, Apparatus and Methods Using Additive Manufacturing Techniques, filed Aug. 7, 2015, which is incorporated herein in its entirety by reference.

FIELD

The present invention relates to architectural manufactures, such as windows and doors, and more particularly, curtain wall, fixed and operable window, window accessories, such as panning, muntins and trim and to such manufactures and methods for making such windows and features.

BACKGROUND

Windows, doors, skylights and structural components made from materials such as aluminum, alloys thereof, steel and plastics are known. For example, window and door assemblies may be made from aluminum alloy extrusions. Windows manufactured with aluminum frame and thermal break components are also known. For example, manufacturers use pour-and-debridge and crimped polyamide strips to make aluminum windows with thermal breaks. The pour-and-debridge type window uses liquid polyurethane poured in the pocket of an aluminum extrusion. After the polyurethane solidifies, the aluminum backing of the pocket is cut away. The process involves four different operations: polyurethane mixing, lancing the aluminum extrusion, abrasion conditioning of the aluminum extrusion and cutting the backing of the thermal break. The crimped polyamide method uses polyamide (or other polymer) strips that are crimped at both ends into the internal and external aluminum extrusions of the window frame. In this case, the manufacturing process requires three different operations: knurling the aluminum extrusions, inserting the polyamide and crimping the aluminum extrusions. Windows that use pour-and-debridge thermal breaks may have a general U factor of about 0.5 Btu/h ft$^2$ F and windows that use crimped polyamide may have a general U factor of about 0.3 Btu/h ft$^2$ F. This corresponds to about an R3 thermal resistance. Both of these technologies require a significant number of manufacturing steps and expensive manufacturing equipment. Typically lengths of material are formed, such as plastic or aluminum extrusions, cut and mitered to size, machined to permit the use of fasteners and joined from multiple pieces. Alternative methods, apparatus and manufactures for producing windows, doors and other structural and architectural components remain desirable.

SUMMARY

The disclosed subject matter relates to an architectural manufacture having a plurality of spatially distributed deposits of material connected one to another to form the architectural manufacture.

In another embodiment, the deposits are in the form of least one of dots, lines or ribbons.

In another embodiment, the architectural manufacture is monolithic.

In another embodiment, the deposits are spatially distributed to form areas of greater and lesser mechanical strength.

In another embodiment, the areas of greater mechanical strength have thicker or denser structural walls.

In another embodiment, the areas of greater mechanical strength have a rib on a surface thereof.

In another embodiment, the rib is internal to the manufacture.

In another embodiment, the manufacture has a corner and the rib is at the corner.

In another embodiment, the manufacture has hollows therein.

In another embodiment, the hollows are defined by exterior members and internal members.

In another embodiment, the exterior members include a plurality of exterior walls and the internal members include a network of structural elements.

In another embodiment, the network of structural elements includes a plurality of pyramids.

In another embodiment, the manufacture has a plurality of internal hollow cells

In another embodiment, the architectural manufacture is composite, having a plurality of different materials for forming associated sub-portions.

In another embodiment, the different materials have different thermal properties.

In another embodiment, the different materials have different mechanical properties.

In another embodiment, at least one sub-portion is made of a metal and at least one sub-portion is made of plastic.

In another embodiment, at least one sub-portion is not made by additive manufacturing.

In another embodiment, at least one sub-portion is an extrusion.

In another embodiment, a first portion is an outer cladding on a second portion.

In another embodiment, a first portion is an interior reinforcement structure.

In another embodiment, the interior reinforcement structure is at least one of a a spine, a beam, or a grid.

In another embodiment, a second portion includes a foam material.

In another embodiment, further including an adhesive to join a first sub-portion to a second sub-portion.

In another embodiment, the architectural manufacture is at least one of a window or a door.

In another embodiment, the architectural manufacture is an entire window assembly.

In another embodiment, the window assembly includes hardware elements.

In another embodiment, the hardware elements include a metal plate.

In another embodiment, the hardware elements include at least one of a lock, handle or a hinge.

In another embodiment, the manufacture is a frame for at least one of a window or a door.

In another embodiment, the frame surrounds a glazing panel.

In another embodiment, the frame has a monolithically formed first sub-portion with a recess for receiving the glazing panel and a second portion extending over the glazing panel and attached to the first portion capturing the glazing panel there between.

In another embodiment, the frame has at least one of integral glass setting blocks or integral anchoring clips.

In another embodiment, the manufacture includes a corner module with a male portion capable of inserting into an extruded member to form a frame.

In another embodiment, the male portion is a first male portion and further comprising a second male portion extending from the corner module at an angle relative to the direction of extension of the first male portion, the second male portion capable of inserting into another extrusion to form the frame.

In another embodiment, the outer cladding is a clip-on cap.

In another embodiment, the outer cladding is a cap with a portion thereof imbedded in the second portion.

In another embodiment, the window is curved or angled.

In another embodiment, the window defines a hollow three dimensional space.

In another embodiment, the window includes at least one of a muntin, panning or trim.

In another embodiment, a surface texture of the manufacture simulates wood grain.

In another embodiment, an exterior surface of the manufacture is coated.

In another embodiment, a method for making an architectural manufacture, includes the steps of: (a) depositing a plurality of deposits of a material having a first flowable state and a second non-flowable state via a dispenser head having an outlet, the dispenser head dispensing the material in the first flowable state under the control of a computer, the computer controlling the position of the dispenser outlet in space and the volume of material dispensed in accordance with additive manufacturing techniques, the computer guided by design data for the architectural manufacture.

In another embodiment, further including the step of developing the design data.

In another embodiment, the step of developing the design data includes ascertaining dimensions of the architectural manufacture by digitally scanning the structure for which the architectural manufacture is made.

In another embodiment, the step of digitally scanning is 3D scanning.

In another embodiment, further including the step of subjecting the design data to finite element analysis.

In another embodiment, further including the step of altering the design data in light of the finite element analysis to improve shape optimization.

In another embodiment, further including the step of subjecting the design data to thermal analysis and altering the design data based upon the thermal analysis.

In another embodiment, a final dimension of the architectural manufacture is achieved by post processing.

In another embodiment, the post processing is by material removal.

In another embodiment, the plurality of deposits of material include a first ribbon of material and a second ribbon of material, the second ribbon of material printed over the first ribbon of material generally parallel and laterally shifted relative to the first ribbon of material.

In another embodiment, an apparatus for making architectural manufactures, includes: a support structure for the architectural manufacture; a supply of material having a flowable state and a non-flowable state; at least one print head capable of depositing the flowable material in the first flowable state at a plurality of selected positions in space; a print head moving apparatus capable of moving the print head in space to allow the deposition of the material at a plurality of 3D coordinates; and a computer programmed to issue movement instructions to the print head moving apparatus based upon design data modeling the architectural manufacture accessible to the computer.

In another embodiment, further including a hardening device for rendering the material non-flowable.

In another embodiment, the support structure is capable of moving.

In another embodiment, further including a plurality of print heads capable of simultaneously depositing material.

In another embodiment, the plurality of print heads are capable of moving independently or in conjunction.

In another embodiment, the apparatus is mobile and capable of being transported to a work site.

In another embodiment, the apparatus is portable and capable of being mounted on a structure, such that the material deposited by the print head is deposited on the structure.

In another embodiment, the apparatus is capable of being inserted into an aperture in the structure and operated to deposit material on the structure proximate the aperture.

BRIEF DESCRIPTION OF THE DRAWINGS

For a more complete understanding of the present invention, reference is made to the following detailed description of exemplary embodiments considered in conjunction with the accompanying drawings.

FIG. 7 is a perspective, partially phantom view of a window frame made in accordance with an alternative embodiment of the present disclosure.

FIG. 8 is a plan view of the internal structure of the window frame of FIG. 7.

FIG. 9 is a perspective view of the internal structure of the window frame of FIG.

FIG. 27 is a perspective view of a mobile additive manufacturing unit at a jobsite in accordance with an alternative embodiment of the present disclosure.

FIG. 28 is a perspective view of a mobile additive manufacturing unit operating with a window aperture of building in accordance with an alternative embodiment of the present disclosure.

FIG. 29 is an enlarged view of the additive manufacturing unit of FIG. 28.

FIG. 31 is a cross-sectional view of a bead of printed material in accordance with an alternative embodiment of the present disclosure.

FIG. 32 is a cross-sectional view of a groups of beads of printed material forming a printed body in accordance with an alternative embodiment of the present disclosure.

FIG. 33 is the printed body of FIG. 32 after post-processing in accordance with an alternative embodiment of the present disclosure.

FIG. 36 is a perspective view of a flat printed window in accordance with an alternative embodiment of the present disclosure.

FIG. 37 is a perspective view of a curved printed window in accordance with an alternative embodiment of the present disclosure.

FIG. 38 is a perspective view of an angular printed window in accordance with an alternative embodiment of the present disclosure.

FIG. 39 is a perspective view of the curved printed window of FIG. 37 installed into an opening between diverging walls of a building.

FIG. 40 is a perspective view of the angular printed window of FIG. 38 installed into an opening between diverging walls of a building.

FIG. 41 is a perspective view of a compound window structure having multiple glazing panels with a pyramidal center structure in accordance with an alternative embodiment of the present disclosure.

FIG. 42 is a side view of the window structure of FIG. 41.

FIG. 43 is a top view of the window structure of FIG. 41.

FIG. 44 is a front view of the window structure of FIG. 41.

DETAILED DESCRIPTION OF EXEMPLARY EMBODIMENTS

Figure 1B:
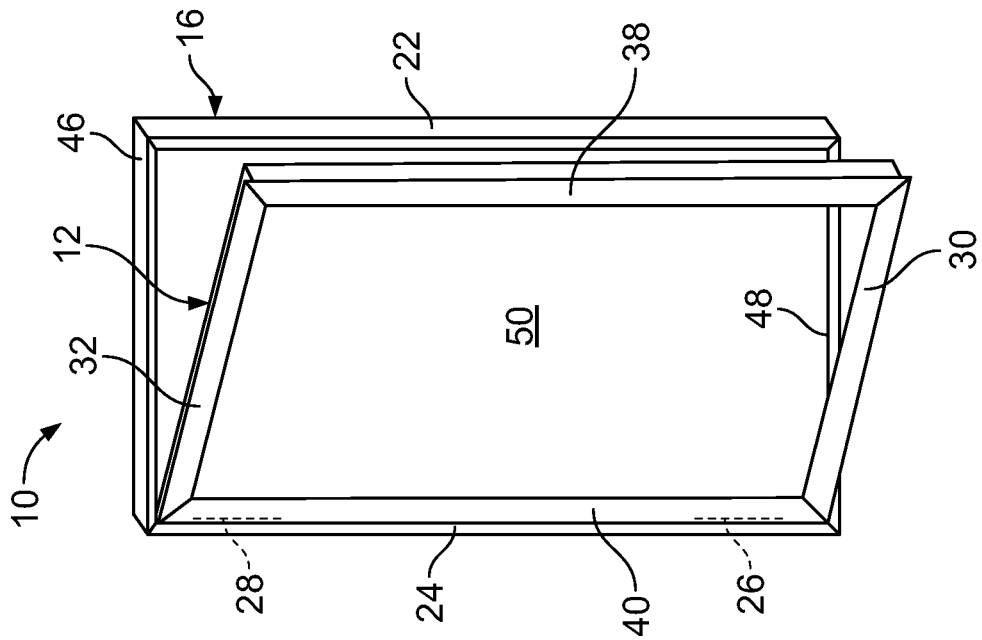
FIGS. 1A and 1B are front views of a casement outswing window assembly in accordance with an embodiment of the present disclosure in the closed and opened states, respectively.

The present disclosure reveals a novel manufacturing technology that allows manufacture of high performance windows via simple, economic and ecological manufacturing processes. The present disclosure recognizes that the manufacture of architectural products may be done via additive processes in contrast to the more traditional subtractive manufacturing techniques of cutting, drilling, joining, etc. The additive manufacturing (AM) processes contemplated by the present application include 3D printing, selective laser sintering (SLS), selective laser melting (SLM) and stereo lithography. The present disclosure also contemplates the options of utilizing data obtained from computer aided design (CAD) and computer aided manufacturing (CAM) models, as well as data obtained from 3D scanning and finite element analysis (FEA) to drive and/or direct the AM process employed for manufacturing the architectural manufacture, e.g., a window or door. Aspects of the present disclosure include architectural manufactures, such as windows and doors having a composite construction with variations in composition structure, density and distribution of materials within the body of the manufacture. These variations may be driven by the thermal and structural requirements of the manufacture. The manufactures may utilize an outer layer or inner framework upon which or around which is deposited an additively manufactured portion to form the final product. For example, one or more outer surfaces of the manufacture may be made from an aluminum extrusion and a core is made from a high density foam with low thermal conductivity and good structural properties. In another alternative a reinforcement, such as an extruded aluminum spine, may provide structural rigidity to a manufacture that is produced by coating the framework with one of more layers of foam and plastic that provides thermal insulation and/or an aesthetic outer shape and finish. Adhesives and sealants may be selectively applied by AM to join preformed panels, such as glazing panels to the manufacture produced by AM or to adhere an exterior shell to a core made by AM.

An aspect of the present disclosure is a reduction in lead times for the production of custom architectural products through automated additive manufacturing that may be driven by automatically obtained digital data or models, e.g., those garnered by a 3D scanning device or from a CAD/CAM file produced by an operators entering the exact dimensional requirements for a given application and those dimensions being used to direct the additive manufacturing process. The additive manufacturing process in accordance with the present disclosure is adaptable to be used with existing structural members, such as an extruded aluminum cladding, support structures, such as metal plates of or hinge structures that are embedded in a matrix of 3D printed material(s). In one embodiment, a hinge structure, e.g., a half hinge extending from the manufacture, may be made via 3D AM. The use of additive manufacturing techniques in accordance with the present disclosure avoids the waste associated with subtractive manufacturing methods. The ease with which a given design may be implemented may optionally be used to develop models that may be presented to for customer aesthetic design review and approval as a commercial order pursuit tool. It is anticipated that utilizing the additive methods of the present disclosure will allow elimination of existing conventional manufacturing steps, such as material component takeoff, waste and scrap. The system disclosed in the present application permits flexibility in providing mixed models of a given architectural product, e.g., based upon size, configuration and/or performance and improved assembly cycles over conventional cut and fabricate assembly methods. A given design may be altered "on-the-fly" in response to design changes that arise after production begins. Expedited design-to-manufacture times may lead to decreased or eliminated lead times and closure (dry-in) times for buildings. The additive manufacturing process of the present disclosure permits designs where the architectural manufacture has varying thickness, e.g., at the vertical middle of window where the maximum deflection occurs in order to minimize stress and deflection. The architectural manufacture does not have to be symmetrical and the thickness of walls defining the manufacture may vary as required for the application.

Figure 1A:
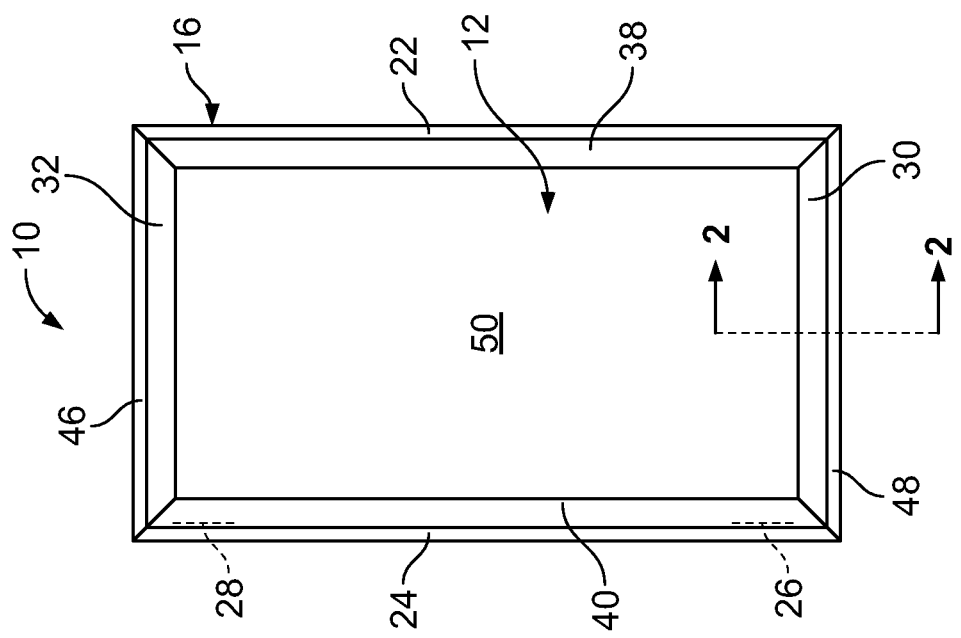

FIGS. 1A and 1B show a casement outswing type window assembly 10 having a sash 12 held within a frame 16 having side jambs 22, 24. The sash 12 pivots on one or more hinges/pivots 26, 28 (diagrammatically shown in dotted lines), allowing the sash 12 to be opened and closed relative to the frame 16. Alternatively, the window assembly 10 may be a hung type window with one or more sashes 12 that are either slideably or hingedly mounted to a frame 16 to allow opening and closing. As yet another alternative, the window assembly 10 may feature one or more non-movable sashes 12. The sash 12 features horizontally oriented rails 30, 32 and vertically oriented stiles 38, 40. The frame 16 has an upper horizontal head 46 and a lower, horizontal sill 48. The glazing 50, e.g., glass or plastic is held within the sash 12. It should be understood that FIG. 1 shows one type of window, but that there are many other types of windows to which the present disclosure may be applied, including moveable and immoveable windows used in residential and commercial applications.

Figure 2:
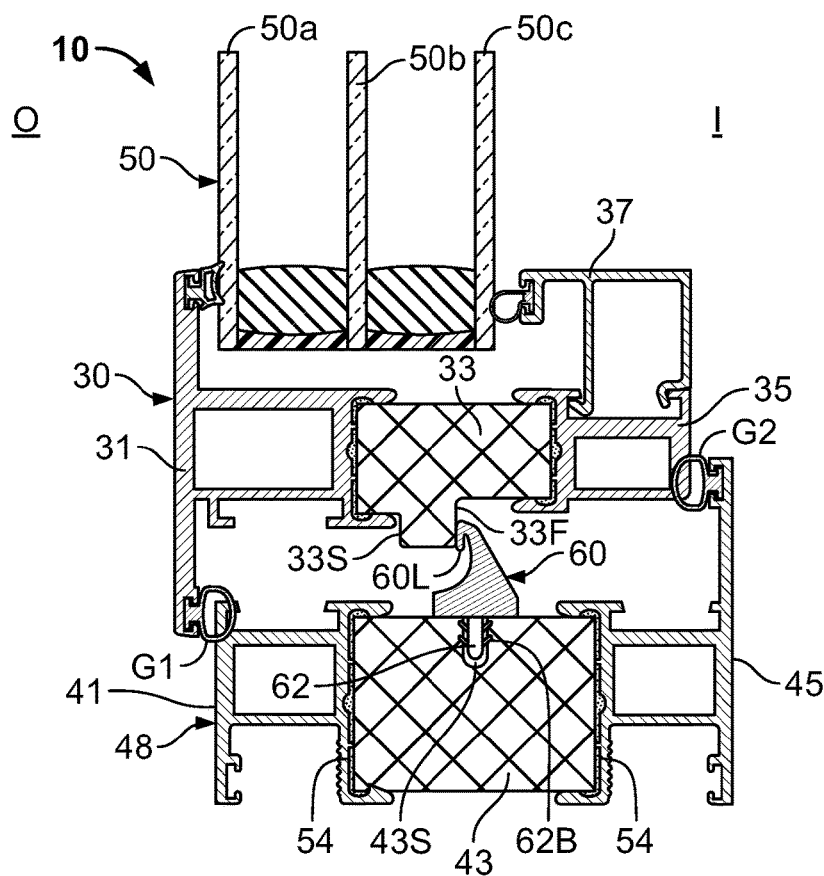
FIG. 2 is a cross-sectional view of the window assembly of FIG. 1, taken along section line 2-2 and looking in the direction of the arrows.
Figure 3:
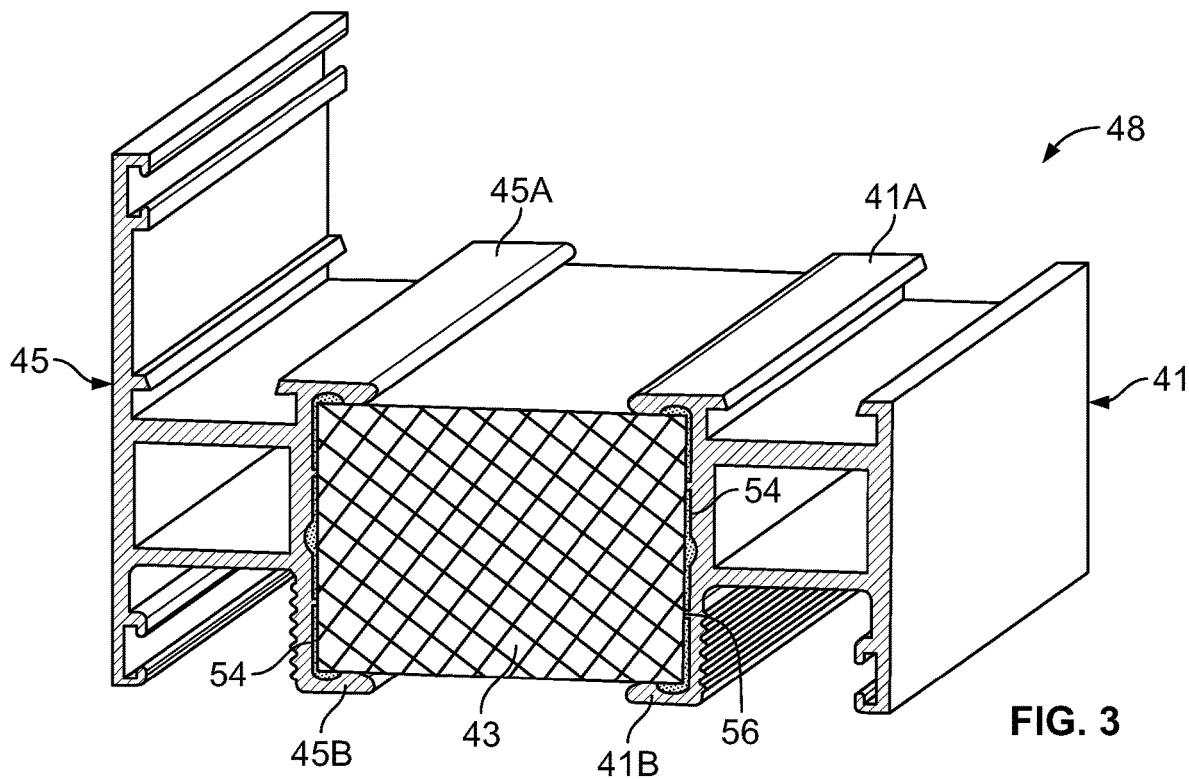
FIG. 3 is a perspective view of a portion of the window assembly of FIGS. 1 and 2.

FIGS. 2 and 3 show that the rail 30 may be formed from a plurality of sub-parts 31, 33, 35, 37. The sub-parts 31, 35 and 37 are in the form of extrusions, e.g., of aluminum. The sub-part 33 is a structural foam member, e.g., made from high density polymeric foam, e.g., PVC, polyurethane, etc. having structural properties (tensile strength, shear strength, etc.) suitable for this application. The sub-parts 31 and 35 are mechanically and adhesively coupled to the foam member 33 to form the rail 30. The stiles 38, 40 and rail 32 may be similarly constructed to surround and support the glazing unit 50, which is, in this instance, a triple glazed unit having three spaced glass panes 50a, 50b, 50c. The window frame 16 may have a similar composite construction. For example, the cross-sectional view of the sill 48 shown in FIGS. 2-7 shows a composite construction made from sub-parts 41, 43 and 45, with sub-parts 41 and 45 being extrusions, e.g., of aluminum alloy and sub-part 43 being a structural foam member interposed there between. The foam sub-parts 33 and 43 have a low thermal conductivity of, e.g., about 0.006 W/mK to 0.043 W/mK and function as a structural component as well as a thermal break between the aluminum extrusions 31, 35 and 41, 45, respectively.

FIG. 2 shows a gasket 60 with a push-in, barbed leg 62 received in slot 43S in foam sub-part 43. The barbed leg 62 facilitates insertion of the leg 62 into the slot 43S, but resists withdrawal due to the orientation of the barbs 62B. A contact lip 60L of the gasket 60 abuts against face 33F formed on a downwardly extending shoulder 33S of foam sub-part 33 to create a seal against air infiltration when the window assembly 10 is closed. It should be noted that the gasket 60 provides a redundant/additional seal over and above the seals provided by gaskets G1, G2 proximate the outside environment O and the inside environment I, respectively. In this embodiment, the foam sub-parts 33 and 43 participate in the sealing function of the window assembly 10 in addition to the structural and thermal break functions that they perform. The foam sub-part 33 is easily adapted to this function in that the shoulder 33S can be formed by machining/removing material from the foam sub-part 33. Alternatively, the shoulder 33S can be formed during formation of the foam sub-part, e.g., by injection molding. In a similar manner, the structural foam composition of foam sub-part 43 lends itself to easy formation of slot 43S by machining the slot 43S or by injection molding that feature into the foam sub-part 43. The foam sub-parts 33, 43 may alternatively be cut from a larger block of foam, e.g., using a knife, saw, laser, torch, water or air jet.

In accordance with an embodiment of the present disclosure, one or more of the sub-parts 31, 33, 35, 37, etc. may be formed by 3D printing. For example, instead of being made from an aluminum extrusion, subpart 37 may be formed of a polymer, such as ABS, PLA, Nylon, etc. that is "printed" by a 3D printing print head. In this manner, the 3D printed subparts 31, 33, 35, etc. may be first formed and then assembled to the other sub-parts, 31, 33, 35, etc. to make the window assembly 10. As is known, various materials may be used in different additive processes. For example, a manufacture made from aluminum metal may be formed by EBF, DMLS, EBM, SLM, SHS or SLS using an additive methodology. In another alternative, a plurality or all of the sub-parts 31, 33, 35, 37, etc. may be 3D printed contiguously.

Figure 4:
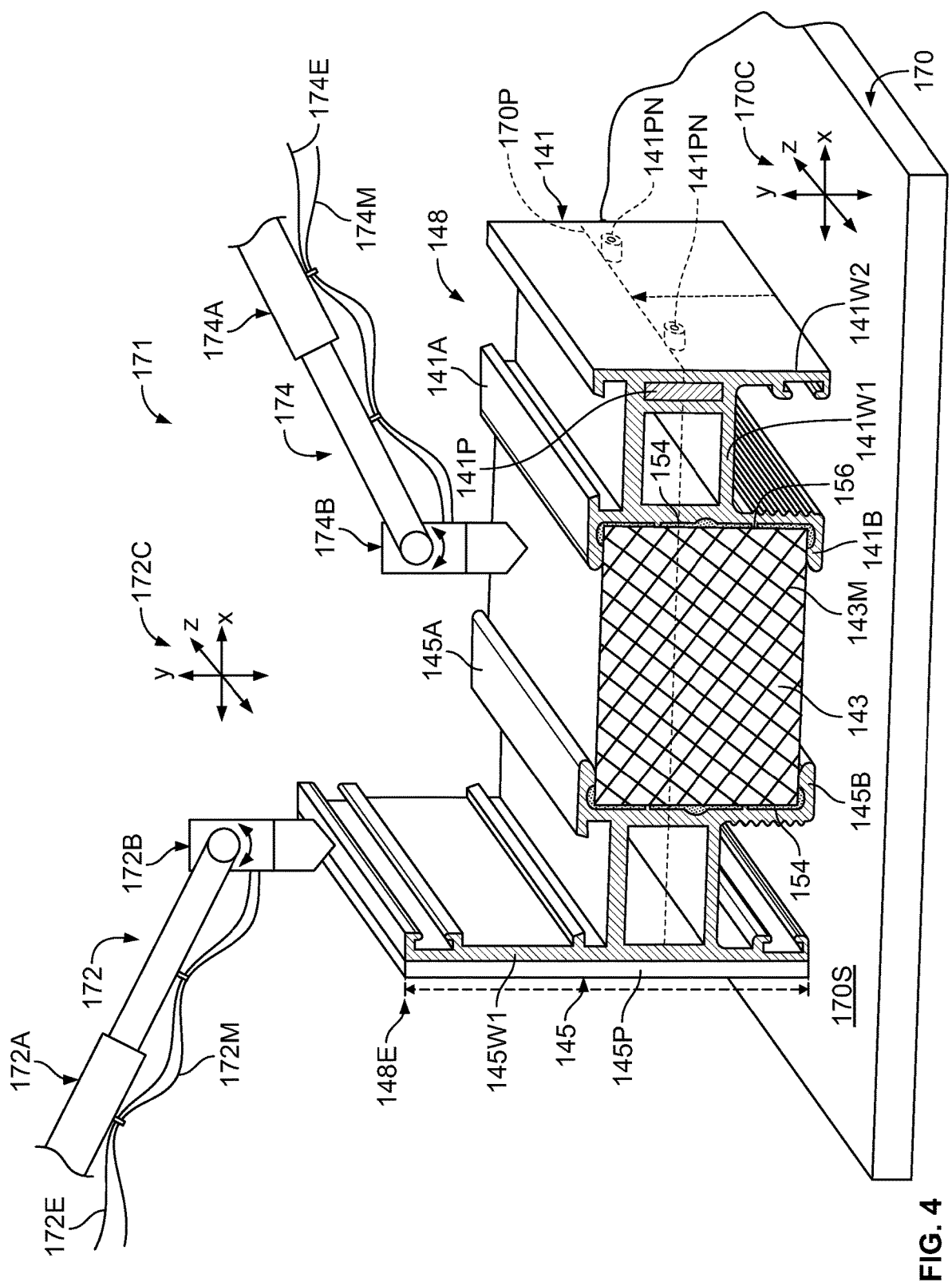
FIG. 4 is a diagrammatic view of method and apparatus for forming a composite member like the portion shown in FIG. 3.

FIG. 4 shows a sill 148 of a window assembly like window assembly 10 being made by an additive manufacturing process. More particularly, the sill 148 is shown on a table 170 that is optionally movable on a plurality of axes X, Y and Z as shown by coordinate system 170C. The table 170 may be moved by any number of mechanical, pneumatic or electrical positioning means under computer control. A first printing device 172 has a telescoping arm 172A with a print head 172B at one end. The print head 172B is supplied with media, such as a polymer, like ABS or PLA in liquid, powder, gel or pellet form via conduit 172M. In the case of thermoplastic powders or pellets, the print head may have a heating element to melt the media before it is dispensed. Electrical power and control signals are provided to the print head 172B via conduit 172E. In this manner, deposits of media, e.g., in the form of dots, lines or ribbons (not shown) may be deposited by the print head 172B on the surface 170S and then on the formed manufacture 148, as it is built up. A second printing device 174 has a telescoping arm 174A with a print head 174B at one end. The print head 174B is supplied with media via conduit 174M and electrical power and control signals via conduit 174E. The media supplied by conduits 172M and 174M may be the same or may be different. For example, one print head 172B may be supplied with a hard plastic, such as ABS and the other print head 174B may be supplied with a foaming polymer, such as polyurethane. Materials such as fiber reinforced ABS and rubber may also be printed. The print heads 172B and 174B are movable on a plurality of axes X, Y and Z as shown by coordinate system 172C. The position of the arms 172A, 174A and the print heads 172B, 174B are determined under computer control. As with additive manufacturing generally, either the support structure (here table 170), the print head(s) 172B, 174B, or both are moved as the additive manufacturing occurs to deposit the multiple "pixels" of deposited material at selected locations to form the manufacture 148. This typically occurs in multiple parallel planes 170P, starting with the surface 170S of the table 170 and finishing at the upper extent 148E of the manufacture 148. As is known in the field of machining and additive manufacture, print heads and supports may be moved in more than in the X, Y and Z directions, i.e., as described in the terms of art "5-axis printing" and "5-axis machining." In addition, 6 axis printing and machining is also know where displacements of the tool/print head may be made in X, Y and Z directions as well as executing yaw, pitch and roll movements. Embodiments of the present disclosure may be implemented using 5 or 6 axis printing.

In the sill manufacture 148 shown in FIG. 4, several different materials are used, more specifically, the sub-parts 141 and 145 are formed from a first polymer, such as ABS and the sub-part 143 is made from a foam, such as polyurethane. The foam of subpart 143 is built up around a matrix or support framework 143M that may be printed from a polymer, such as ABS. Given that the printing is directed by a computer in accordance with a design/data model, which is effectively infinitely variable, the shape and contours of any of the subparts 141, 143 and 145 are highly variable. For example, the thickness of the walls of the 141W1 and 141W2 may be any selected thickness and may vary in thickness over their extent, as determined by the design, which may reflect strength or thermal requirements of the application of the architectural manufacture 148. In addition to printing architectural components, like subpart 143, the present disclosure contemplates printing around components that are held in a given position relative to the manufacture 148, e.g., by fixturing. For example, metal plate 141P may be held in a fixture as the sub-portion 141 is printed around it. In this manner, metal plate 141P may be used as a mounting plate, e.g., for a hinge, handle or other device, via threaded nipples 141PN which are embedded in wall 141W2. In another example of the integration of a non-printed member with a printed portion, cladding plate 145P may be held by fixturing while wall 145W1 is printed next to it. The plate 145P may be made from a metal, such as aluminum or stainless steel and may be provided for aesthetic or functional reasons, e.g., to provide an abrasion-resistant surface. The plate 145P may have a rough surface that forms an interlocking interface with wall 145W1. In another alternative, the wall may be adhered to the subpart 145 after it is printed, or a layer of adhesive may be printed between the plate 145P and the wall 145W1, as the wall 145W1 is printed, to assure a strong bond there between.

The manufacture 148 produced may be dimensioned to interact with and assemble to components that are made by traditional methods. For example, a glazing panel 50 may be inserted into a door or window manufactured by additive methods in accordance with the present disclosure. In preparation for installation of the glazing panel 50, a sealant, such as a silicone sealant, may be printed on the manufacture 148 and then the glazing panel assembled to the manufacture.

Since the additive manufacturing of the present disclosure allows for unlimited variation in the distribution of printed media in three-dimensional space, material saving approaches may be utilized, such as the inclusion of hollows within a given volume of the manufacture 148. In one example, the given volume of printed material may resemble a plurality of hollow, adjacent cells, like a honeycomb. Internal hollows in a member can be used to save material and control heat transmissibility of the member, reducing heat transfer while preserving strength. Selected areas of a manufacture 148 may be provided with increased strength, either attributable to increased use of material, e.g., increasing the thickness/density of material per unit volume or changing the material composition, e.g., using a greater amount of high strength material (media) in a selected area. In one example, the corners of a window or door have a need for increased strength due to anticipated torsional loading and may be reinforced by higher material density or greater use of high strength materials.

Figure 5:
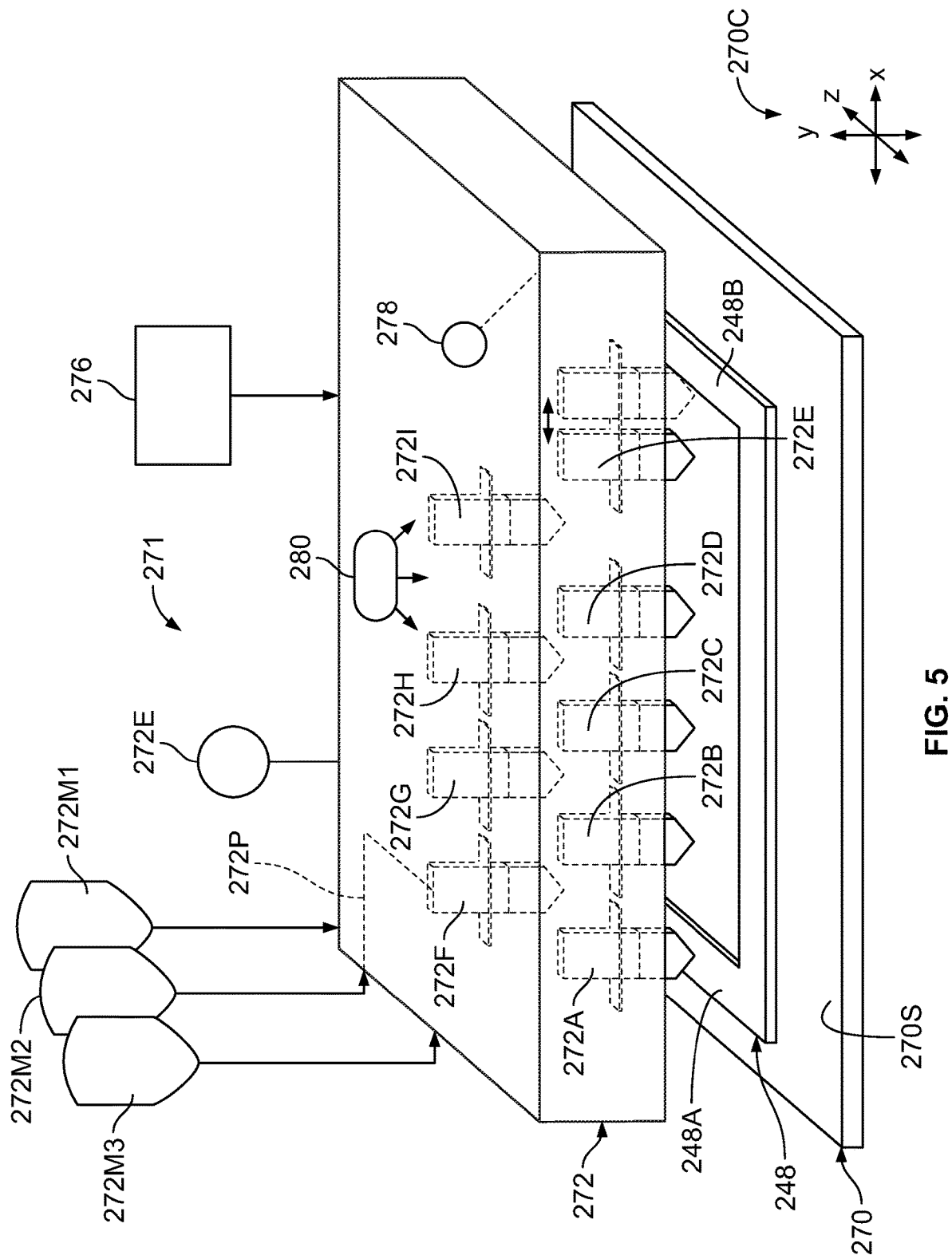
FIG. 5 is a diagrammatic view of a method and apparatus for forming an architectural structure in accordance with an alternative embodiment of the present disclosure.

FIG. 5 shows an alternative embodiment of the present disclosure in which a print head assembly 272 has a plurality of print units 272A-272I. The print head assembly 272 is positioned relative a table 270 that supports a manufacture 248 on surface 270S thereof. Either or both the print head assembly and/or the table 270 may be moveable on a plurality of axes, as illustrated by coordinate system 270C. While a table 270 support is depicted, a moving belt or other type of support surface could be used. Media 272M1-272M3 of one or more types may be distributed to the print head assembly 272 from associated reservoirs for printing the manufacture 248. The media 272M1-272M3 may be channeled to the print units 272A-272I by conduits or passageways 272P within the print head assembly 272. The print units 272A-272I may optionally be individually moveable relative to the print head assembly 272, as shown by print unit 272E via electrical motors, such as, linear motors or stepper motors acting through pulleys and belts. The media 272M1-272M3 may be supplied under pressure, such that the print units 272A-272I act as valves that dispense the pressurized media. The print units 272A-272I may be electromagnetically controlled to regulate the duration of valve opening and the amount of media dispensed for each deposited dot/pixel, line or ribbon of media that is used to build up the manufacture 248. The dispensing of the print units 272A-272I, any individuated positioning thereof, the positioning of the table 270 and/or the print head assembly 272 is all coordinated and controlled by a programmed computer 276. The printing system 271 of FIG. 5 may be used to rapidly print an architectural manufacture 248, in that multiple print units 272A-272I may be activated simultaneously to deposit media, e.g., on both sides 248A, 248B of the manufacture 248 simultaneously. While only nine print units 272A-272I are illustrated in FIG. 5, any number could be used, 100, 500 or 10,000 and their spatial distribution may be such as to increase the speed of printing of the manufacture 248. For example, in the case of manufacture 248 that has a frame-like shape, multiple print units 272A-272I may be arranged in the print head assembly 272 roughly approximating the frame shape, such that small displacements of the print units 272A-272I and/or the table 270 and/or the print head assembly 272 can achieve rapid printing of a plane of the manufacture. One or a plurality of sources of radiation 278, e.g., a UV light or laser may be used in conjunction with the printing to fix/cure the printed media, e.g., 272M1 after printing, depending upon the identity of the media and how it hardens. For media that hardens by cooling, a source 280 of cold air or other gas, such as carbon dioxide, may be provided to cool the printed media, e.g., 272M2, in order to allow the media to rapidly achieve a temperature that is optimal for printing the next layer and to increase the rate of printing.

Figure 6:
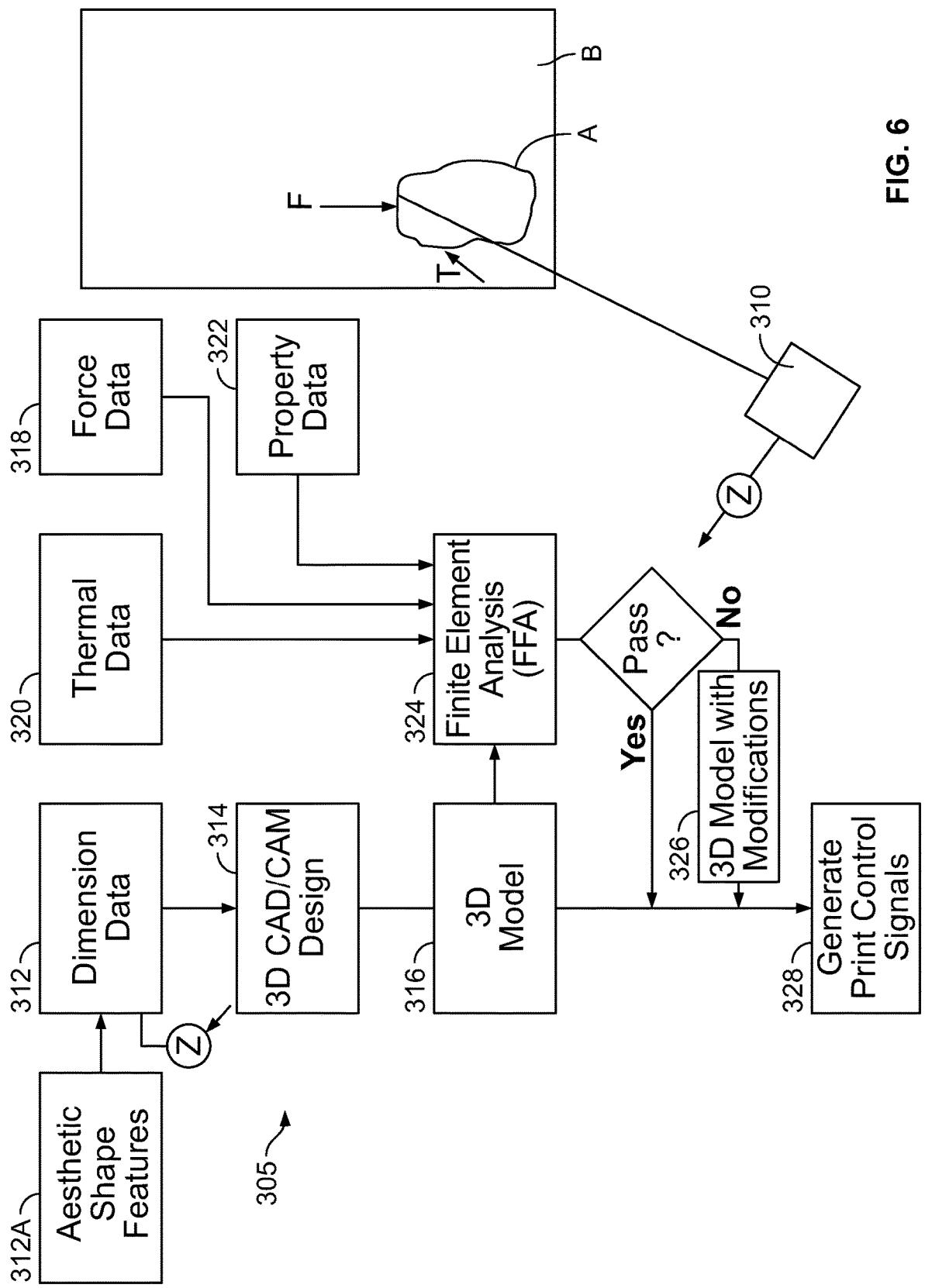
FIG. 6 is a diagrammatic view of a method and apparatus for developing a model that may be referenced in forming an architectural structure in accordance with an alternative embodiment of the present disclosure.

FIG. 6 shows a system 305 that may be used to gather data and generate a model of the manufacture, e.g., 148, 248 that may be used as the data reference for guiding the computer controller, e.g., 276 (FIG. 5) to direct the process of additive manufacture. More particularly, a given architectural application, e.g. building B, has various architectural features, such as apertures A, which may be for windows, doors, skylights, etc. The aperture A shown is depicted as having a non-regular (complex) shape to illustrate that the system 305 may be used on an aperture A of a given shape to create a model for a manufacture 148, 248 specifically suitable to the design requirements of the building B and aperture A. While FIG. 6 shows a 2D diagrammatic depiction of a building B, it is understood that all buildings would have a 3D shape and that the features, such as the aperture A, would also have three dimensions. A 3D scanner 310, such as a Model Handy Scan 3D scanner available from Creaform may be used to extract the 3D shape of the aperture A from the building B and express that shape in digital form, such as a stereolithography (STL) file that may be received as input data to a CAD program, such as Inventor, available from Autodesk.

In some instances, such as when architectural features (A) are highly regular and precise, e.g., as a consequence of rigidly controlled modular design and manufacture encountered in factory manufactured modules for a high rise building or, in the instance where a high degree of variation and large tolerances are acceptable, the 3D scanner may be unnecessary and factory spec measurements or measurements taken by a tape measure may be suitable dimension data 312 for the architectural problem. Besides functionally defined dimensional data, aesthetic data 312A, e.g., pertaining to surface shape or profile may also be used with the dimension data 312 by a computer running CAD/CAM software 314, such as Inventor from Autodesk to generate a 3D CAD/CAM design/model 316. In accordance with an aspect of the present disclosure, the architectural problem, e.g., the aperture A to be closed, may ultimately be used to define the solution, i.e., the manufacture 148, 248. Further with respect to defining the "problem" to be solved, the manufacture 148, 248 is preferably capable of withstanding the forces F, e.g., compression, wind, etc. that it will encounter when incorporated into the building B. In some instances, the manufacture 148, 248 may contribute to the structural strength of the building B and in other instances their supporting capacity is designed to be minimal. In any case, the force or stress requirements F that will be experienced by the architectural element that is installed in aperture A are preferably determined, e.g., based upon calculations, architectural models of static and dynamic forces and/or empirical measurements. In addition to the force definition of the problem that the manufacture 148, 248 is intended to solve, architectural elements have thermal requirements or objectives T that may also be taken into consideration in their design. This thermal objective T may be expressed as an R-value. In accordance with one embodiment, force data 318 and thermal requirements 320 associated with an architectural feature like aperture A may be used along with property data 322 pertaining to the physical properties of the media, e.g., 272M1-272M3 and the 3D model 316 to perform a finite element analysis 324 on the initial design (3D model) 316 of the manufacture 148, 248. If the FEA indicates that the 3D model 316 executed in the material having the properties reflected in the property data 322 is adequate to meet all force and thermal requirements, the 3D model 316 may be used as the reference data for executing the additive manufacture of the manufacture 148, 248. In the event that the 3D model 316 evidences shortcomings, it may be modified to yield an altered 3D model 326, e.g., by a change in dimensions or materials to yield a more robust model that may be subjected to another round of finite element analysis 324. The 3D model 316 or 326 may then be used by a 3D printer system 171, 271 to generate print control signals 328.

In another alternative approach, the stress intensity over the volume of a 3D CAD/CAM design/model of a manufacture 148, 148 as shown by an FEA may be directly interpreted by a computer into design variations of corresponding magnitude to the stresses. For example, areas of the model showing stress levels exceeding material properties if printed at a constant density, may be automatically increased in density per unit volume proportionally to the level of stress indicated by the FEA. Alternatively, higher strength materials may be printed in greater proportion in areas where the FEA indicates the stress will exceed the capacity of the less strong materials. For example, if a foam member with hollows is called for in the initial model, but the FEA indicates anticipated stresses will cause the foam member to break, then the hollows may be reduced in size or a strong plastic inclusion, e.g., in the form of a reinforcement rib made from ABS may be printed in the volume which would otherwise be too weak if executed in foam material alone.

The methods of the present disclosure may be used to avoid the extrusion of profiles, e.g., in aluminum alloy, as well as the associated cutting, mitering, drilling, machining, joining and sealing same. This may lead to reductions in scrap, and production lead time. The formation of the manufacture 148, 248 based upon the requirements of the architectural problem to be solved may result in windows and doors that fit the building B well, are strong, light and thermally efficient.

FIGS. 7, 8 and 9 show a 3D printed window frame 412 having an outer surface 412S with a plurality of adjacent panels 412S1-412S10, etc. that cover a plurality of internal pyramid elements 412P. The pyramid elements 412P are defined by a plurality of beam members 412B1-412B6 forming the edges of the triangular pyramid elements 412P. The pyramids are conjoined at their corners (the convergence of the conjoined beams) allowing the transfer of stresses from one pyramid to the other. The adjacent panels 412S1-412S10 are also conjoined to each other and to the beams 412B1-412B6 to transfer stresses from the panels 412S1-412S10 to the pyramids 412P and from the pyramids 412P to the conjoined others of the adjacent panels 412S1-412S10. The conjoined pyramids 412P and panels may be considered a monolith due to their formation by 3D printing/ additive manufacture techniques. Because additive manufacturing permits the formation of a compound network or webwork of beams within the confines of a hollow defined by the panels 412S1-412S10, the monolithic window frame 412 has a significant percentage of the volume 412H of the window frame that is hollow (not occupied by the material composing the beams or panels). The hollow volume 412H represents a weight and material savings as well as a volume with reduced thermal conductivity. The hollow 412H may be left hollow or filled with an inert gas, foam or other filler to reduce thermal conductivity. In the case of foam, this may optionally be printed during the additive manufacture of the window frame 412.

Figure 10:
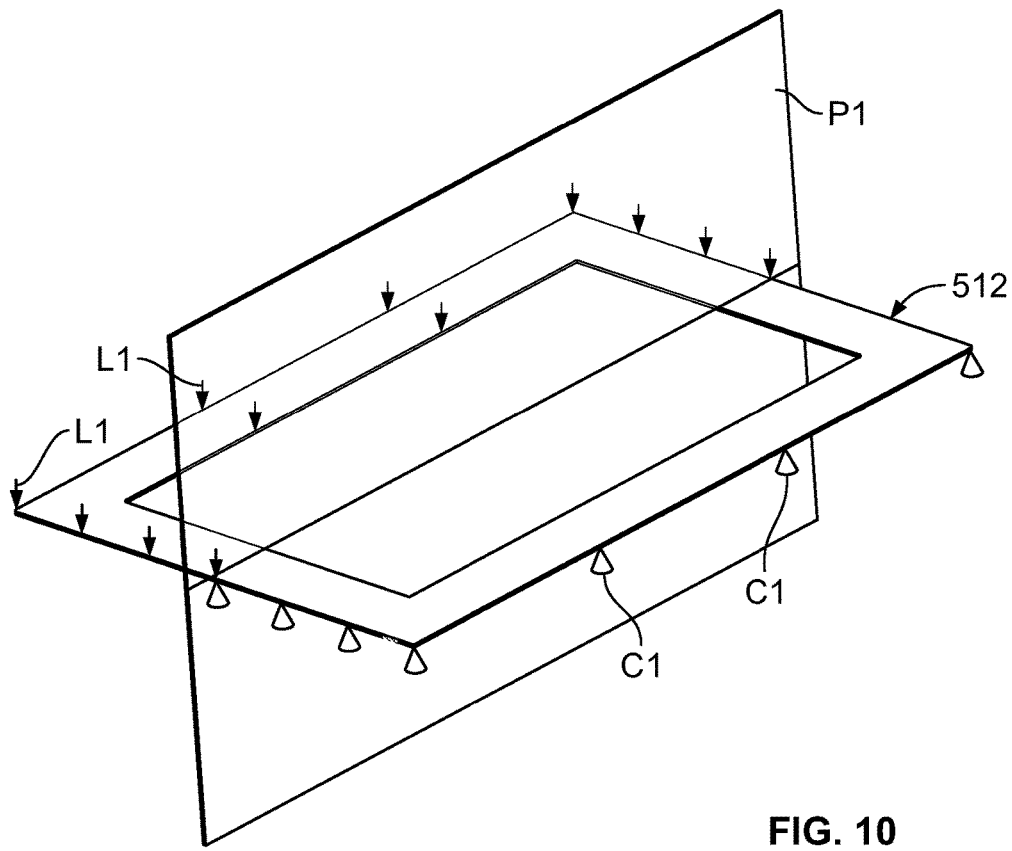
FIG. 10 is a schematic view of a computer topology analysis of a window frame under load.

FIG. 10 shows a uniform load L1 applied to one half of a window frame 512 (as bisected by plane P1 and with support constraints C1 applied to the other half of the frame 512 as revealed in a computer topology analysis.

Figure 11:
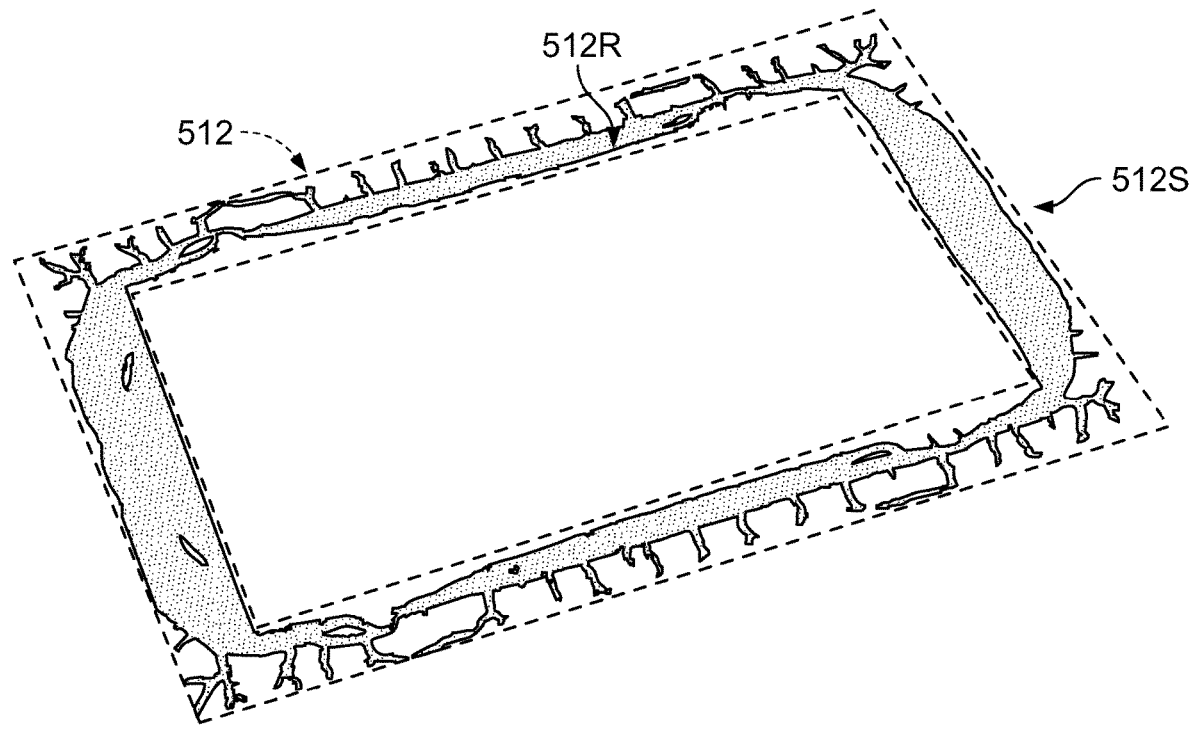
FIG. 11 is a schematic view of a shape optimization resulting from the computer topology analysis of FIG. 10.

FIG. 11 shows a shape optimization 512S of the window frame 512 (shown in dotted lines) of FIG. 10, when subjected to the specific loading simulation L1 and support constraints C1 for the analysis shown in FIG. 10. The shape optimization results in the identification of a region 512R where material should be concentrated.

Figure 12:
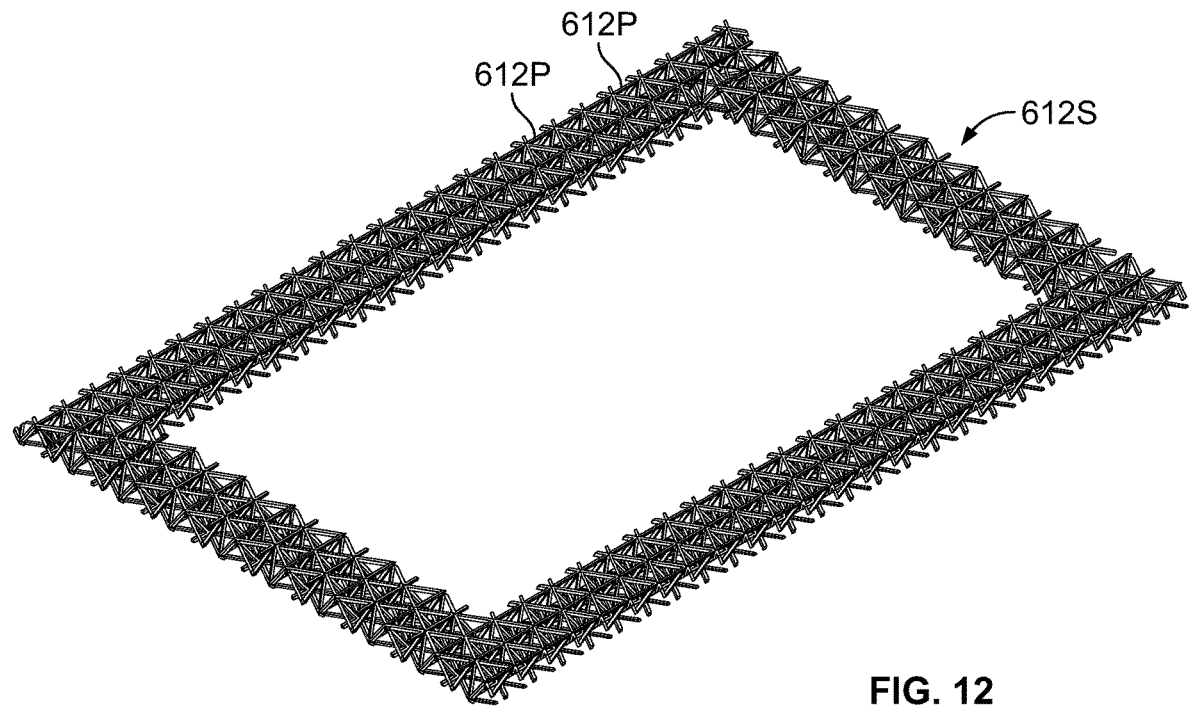
FIG. 12 is a schematic view of a shape optimization of the internal components of a window frame resulting from a computer topology analysis.

FIG. 12 shows a shape optimization 612S based upon a topology analysis applied to the window frame 412 shown in FIGS. 7-9, showing only the internal structure, i.e., the pyramids 612P, as modified by the topology analysis.

Figure 13:
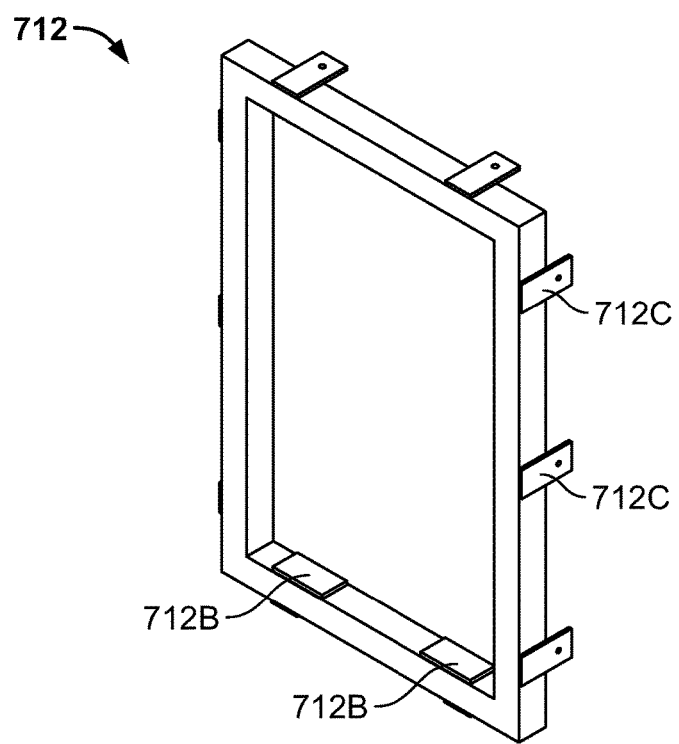
FIG. 13 is a perspective view of window frame in accordance with an alternative embodiment of the present disclosure.

FIG. 13 shows a window frame 712 made by additive manufacturing techniques and featuring glass setting blocks 712B and anchoring clips 712C integrally formed with the frame 712. In accordance with one embodiment, the frame 712 may otherwise be formed in a manner similar to window frame 412, having the same internal pyramid structures and exterior panels. In another optional approach, the window frame 712 may be formed in a manner as shown in FIG. 14 and described below.

Figure 14:
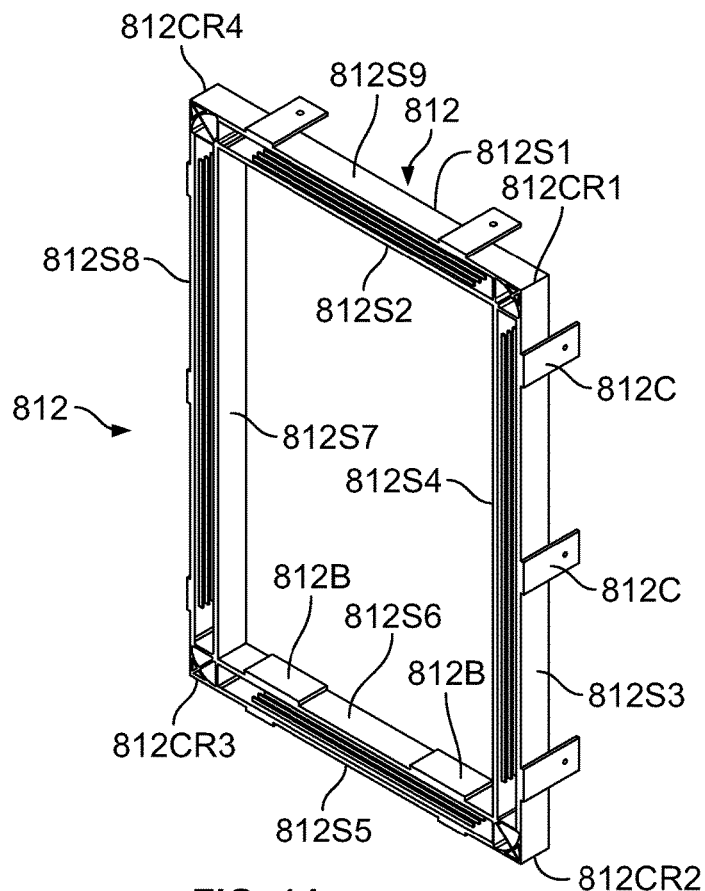
FIG. 14 is a cross-sectional view of the window frame of FIG. 13.

FIG. 14 shows a window frame 812 made by additive manufacturing techniques and featuring glass setting blocks 812B and anchoring clips 812C integrally formed with the frame 812. The window frame 812 has a plurality of panels/surfaces 812S1-812S9 that are integrally joined/ printed. A plurality of strength ribs 812R are formed monolithically on the interior side of the panels 812S4 and 812S5, which are the only ones visible in FIG. 15. Optionally, all panels 812S1-812S9 or any subset of same may be provided with strengthening ribs 812R. The corners 812CR1-812CR4 of the window frame 812, may feature strengthening ribs 812RC1-812RC5. Of these, 812RC4 is arcuate and the remainder radially extend from the center of arc rotation of 812RC4. The internal strengthening features, e.g., ribs 812R and 812RC1-812RC5 may be designed in accordance with results of a Finite Element Analysis (FEA) that showed the weak points of the frame 812 that needed strengthening in light of anticipated stresses.

Figure 16:
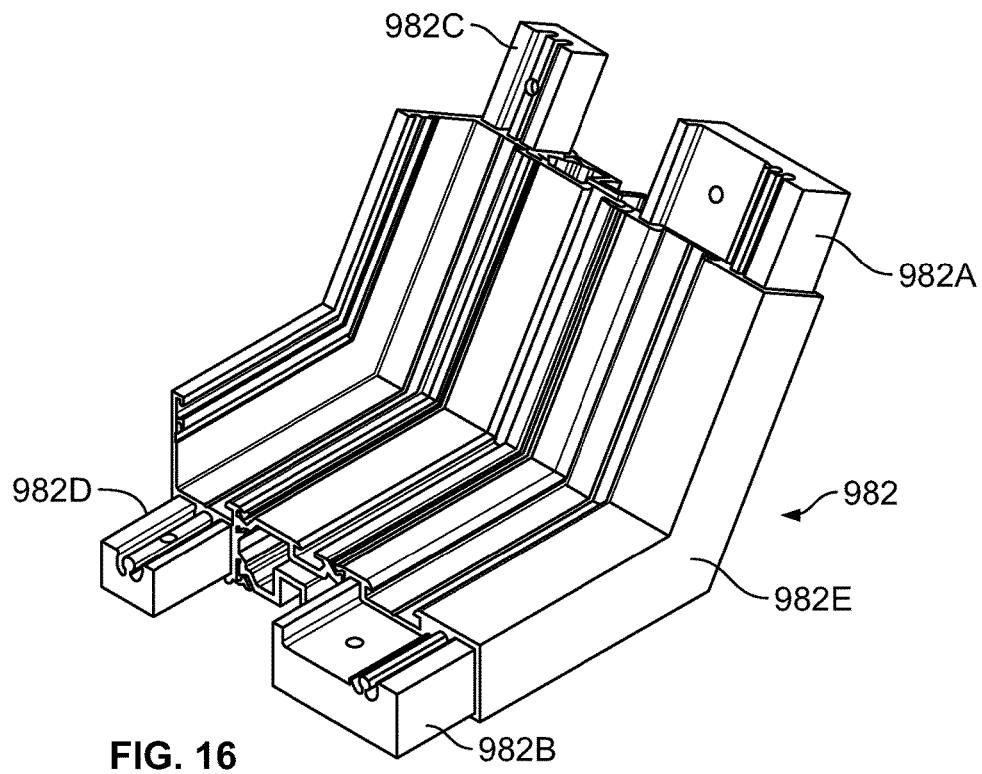
FIG. 16 is a perspective view of a corner module of a window frame in accordance with an alternative embodiment of the present disclosure.
Figure 17:
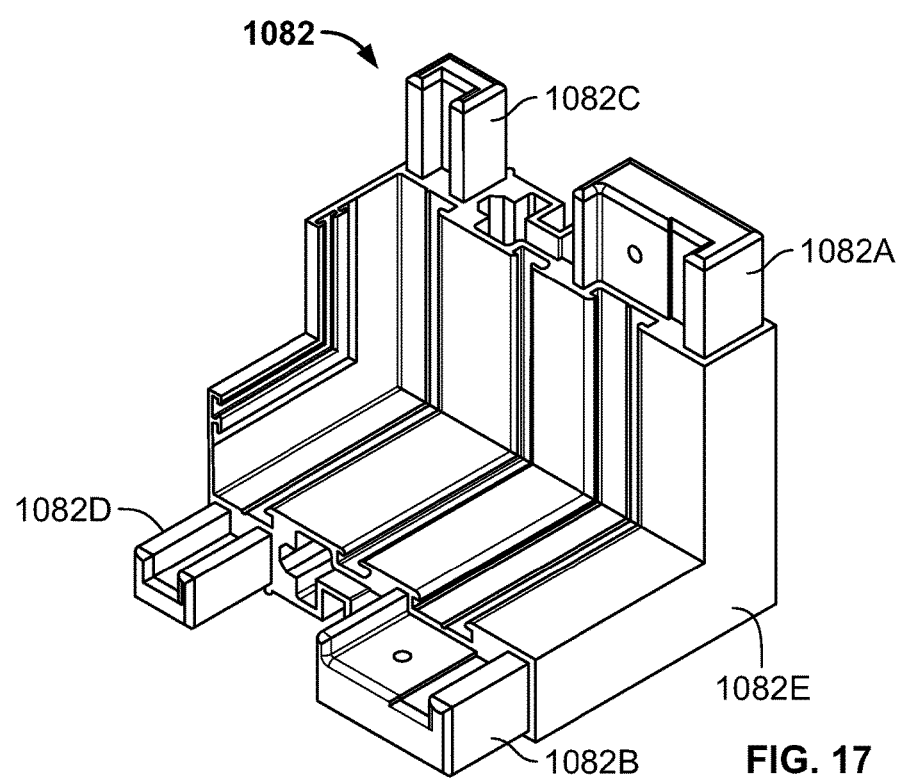
FIG. 17 is a perspective view of a corner module of a window frame in accordance with an alternative embodiment of the present disclosure.
Figure 18:
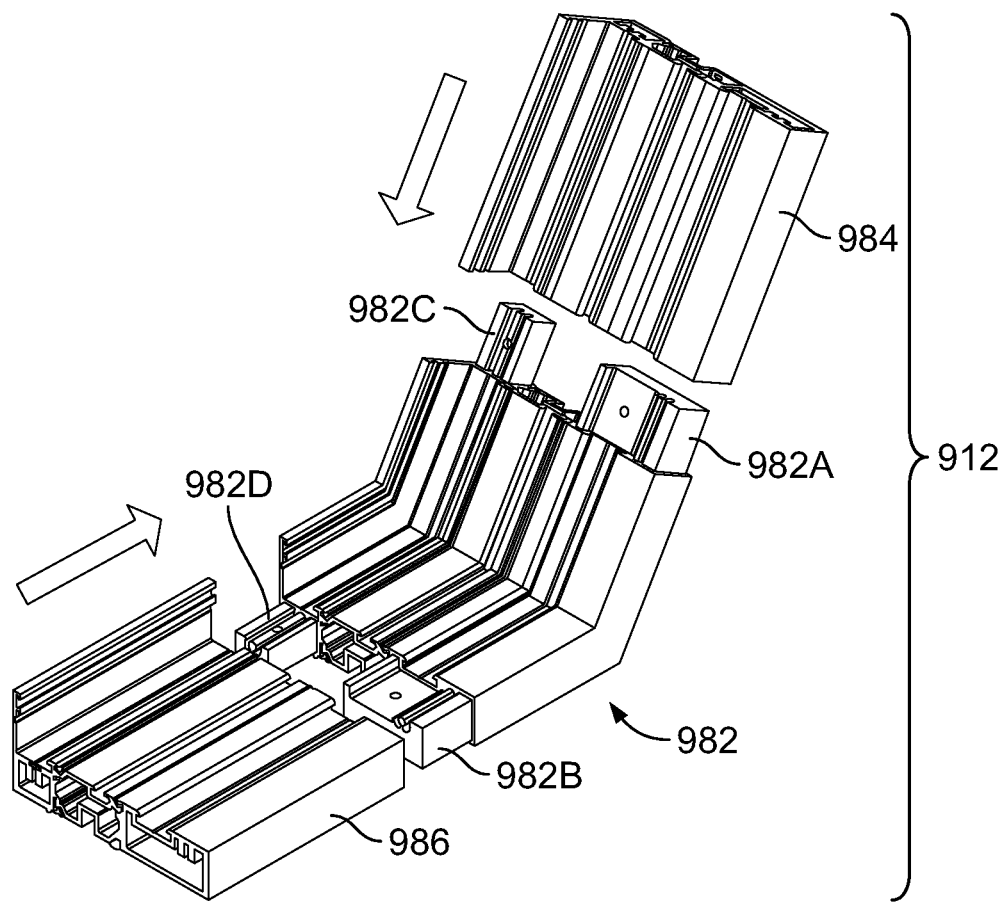
FIG. 18 is a perspective view of the corner module of FIG. 16 juxtaposed next to extrusions with which is assembled to form an assembly in accordance with an alternative embodiment of the present disclosure.

FIGS. 16 and 17 show modular corner elements 982, 1082, respectively, that may be printed using additive manufacturing techniques for forming 135° and 90° angles, respectively on a window frame. The modular corner elements 982, 1082 feature male sub-portions 982A-982D and 1082A-1082D which extend from base portions 982E, 1082 E respectively. As shown in FIG. 18, the male sub-portions 982A-982D may slide into mating hollow extrusions 984, 986 to form a form assembly 912. Similar modular corners 982 may be placed at the other ends of extrusions 984, 986 and accept additional extrusions like 984, 986 to form a closed frame structure 912, e.g., for a window. The connection between modular corners 982 and extrusions 984, 986 may optionally be secured in an assembled condition by frictional interaction, interlocking action or by an adhesive applied to the male portions 982A-982D. The modular corner 1082 of FIG. 17 can be readily seen to operate in a similar way with extrusions like 984 and 986 of FIG. 18 to form a frame assembly with a square corner. The printed corner modules 982, 1082 can be used with existing aluminum extrusions to create custom window frames with custom/different angles. The resultant frame assembly 912, when used in a frame exposed to weather, eliminates possible water penetration at the corners, where the traditional windows have a miter cut that is sometimes penetrated by water. The modular corner 982, 1082 also simplifies a frame assembly process, eliminating complex miter cutting preparation and staking used in the traditional process of frame assembly. Traditional corner keys are also eliminated.

Figure 19:
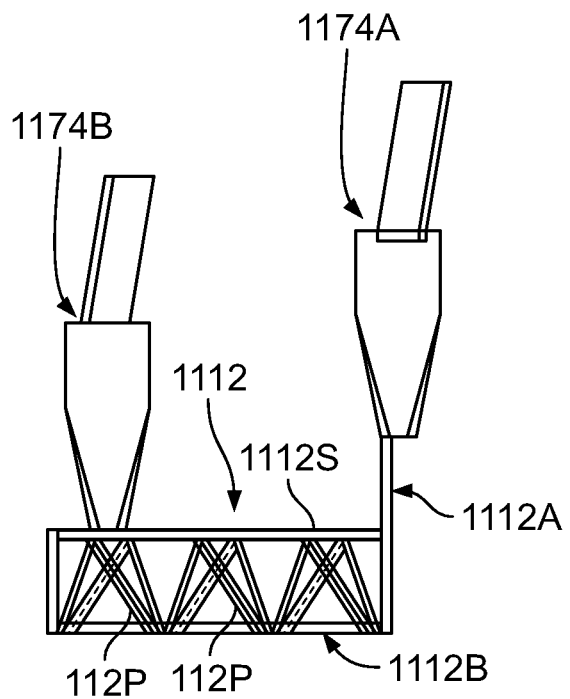
FIG. 19 is a side view of a window frame in accordance with an alternative embodiment of the present disclosure, as it is being fabricated.
Figure 20:
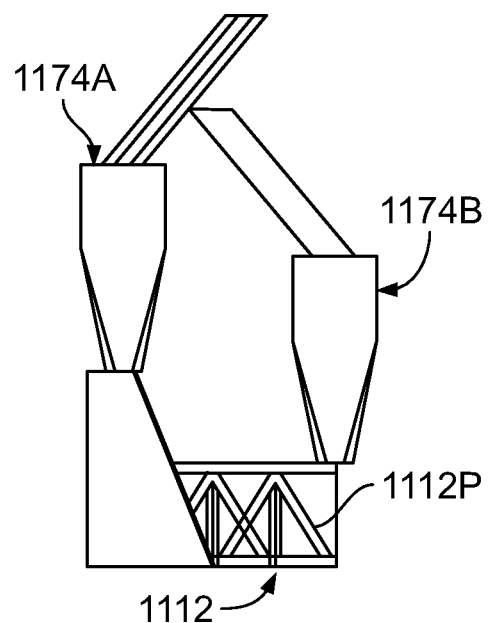
FIG. 20 is another side view of the window frame of FIG. 19.
Figure 21:
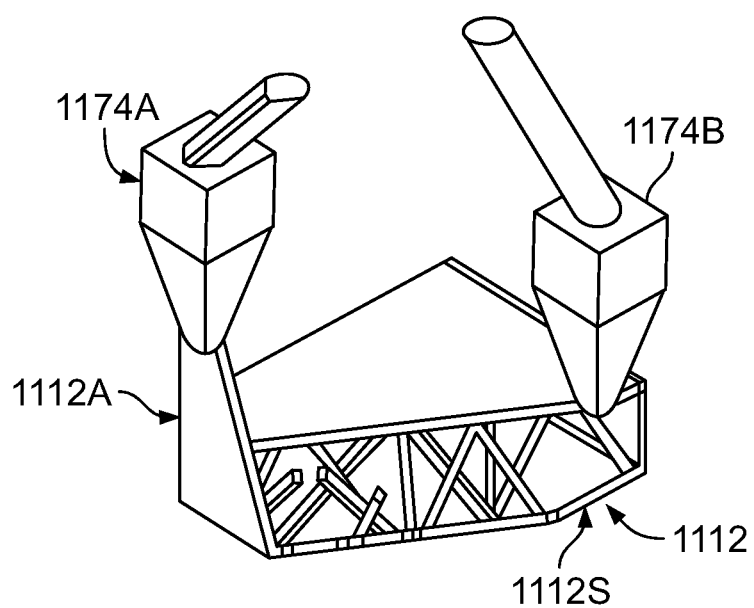
FIG. 21 is a perspective view of the window frame of FIG. 19.

FIGS. 19-21 show an additive manufacturing process for forming a window frame 1112. The window frame 1112 has an aluminum portion 1112A and a plastic portion 1112B, e.g., made from ABS. The aluminum portion 1112A may be formed by a print head 1174A printing molten aluminum or aluminum powder that is melted and adhered to previously printed layers by electrical discharge or laser energy. The plastic portion may be printed by a print head 1174B that prints beads or ribbons of melted plastic that hardens upon cooling or plastic that is cured by radiation, such as UV radiation. The plastic portion 1112B features pyramidal elements 1112P and exterior plates 1112S like those shown in FIGS. 7-9. As can be appreciated, window frames like 1112 with the frame geometry shown would not likely be made by traditional extrusion processes.

Figure 15:
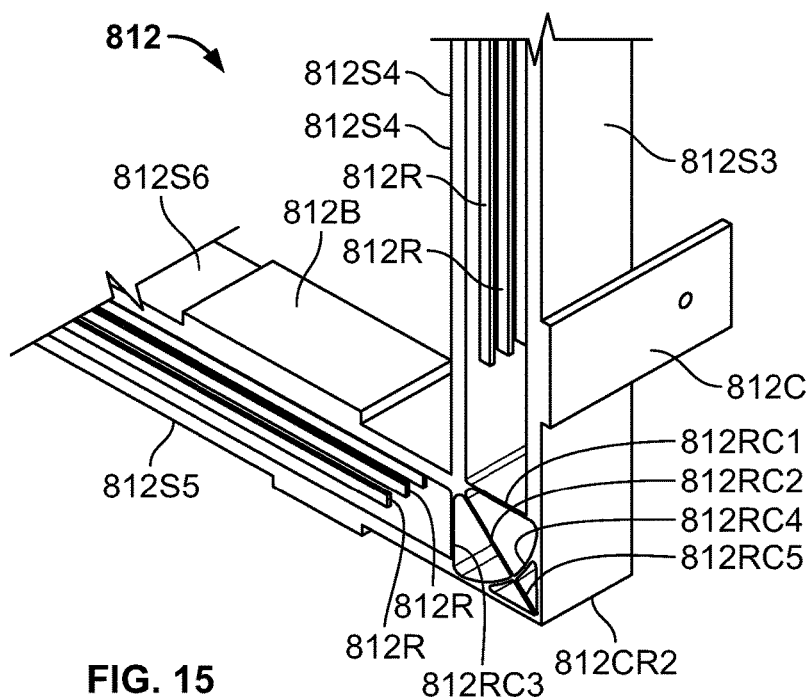
FIG. 15 is an enlarged view of the window frame of FIG. 14.
Figure 22:
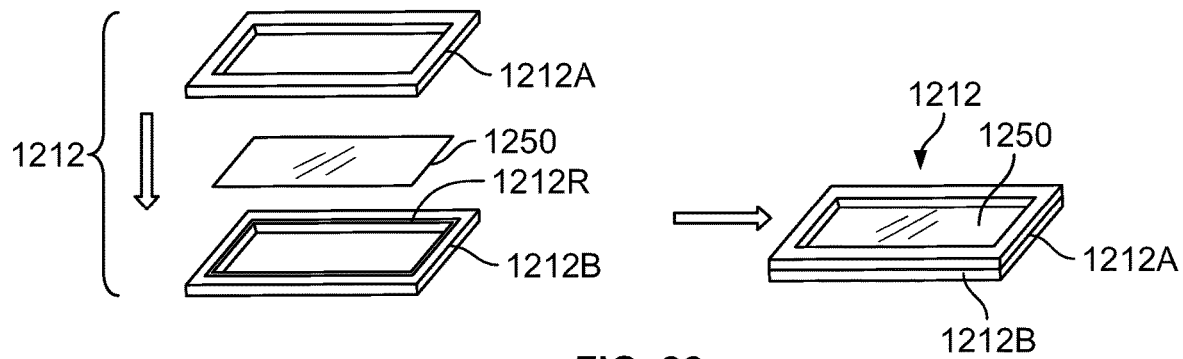
FIG. 22 is a diagrammatic view of a method and apparatus for forming a window assembly in accordance with an alternative embodiment of the present disclosure.

FIG. 22 schematically depicts the fabrication of a window frame 1212 with a glazing panel 1250, e.g., made from glass or a polymer. The window frame 1212 may be made by an additive manufacturing process, e.g., 3D printing, and has two portions 1212A and 1212B, between which the glazing panel 1250 is captured. The window frame portions 1212A, 1212B may optionally have internal features like window frames 412 (FIG. 7-9) or 812 (FIGS. 14 and 15). One or both of the portions 1212A, 1212B may have a recess 1212R to receive the glazing panel 1250 therein and keep it is a given desired orientation relative to the window frame 1212. The two portions 1212A and 1212B may be assembled around the glazing panel 1250, which is captured there between, and then fastened together by fasteners, such as screws or rivets or by an adhesive or plastic welding.

Figure 23:
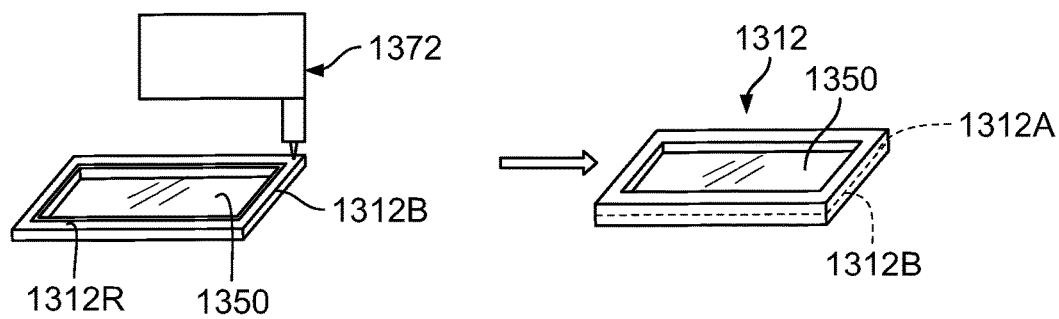
FIG. 23 is a diagrammatic view of a method and apparatus for forming a window assembly in accordance with an alternative embodiment of the present disclosure.

FIG. 23 shows a window frame 1312 with a glazing panel 1350, e.g., made from glass or a polymer. The window frame 1312 may be made by an additive manufacturing process, e.g., 3D printing, wherein a first portion 1312B is 3D printed. The glazing panel is laid on top of the first portion 1312B, which may feature a recess 1312R to receive the glazing panel 1350. A second portion 1312A of the window frame 1312 is then printed directly on top of the first portion 1312B by print head 1372, capturing the glazing panel 1350 within the window frame 1312. Since the second portion is printed on the first portion and fuses with the first portion, forming a monolith, no fasteners or adhesives are need to join the first and second portions. To indicate this monolithic formation, the demarcation between 1312A and 1312B is shown in dotted lines. One could describe the glazing 1350 as being embedded within the window frame 1312.

Figure 24:
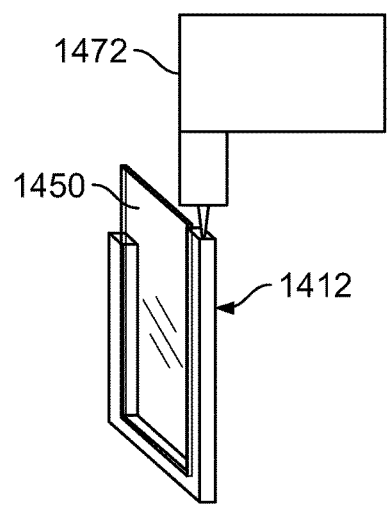
FIG. 24 is a diagrammatic view of a method and apparatus for forming a window assembly in accordance with an alternative embodiment of the present disclosure.

FIG. 24 shows a window frame 1412 with a glazing panel 1450 embedded therein. In contrast to the window frame 1312 of FIG. 23, the window frame 1412 is printed by print head 1472 with the glazing panel 1450 in a vertical, rather than horizontal, orientation. In one approach, a lower portion of the window frame 1412 is printed to define a U-shape with an internal slot to receive the glazing panel 1450, which is slid into the slot in a vertical orientation. The remainder of the frame 1412 can then be printed to embed the glazing panel securely in the frame 1412. In an alternative approach, the glazing panel 1450 can be held by a fixture in a vertical orientation and the frame 1412 printed around it.

Figure 25:
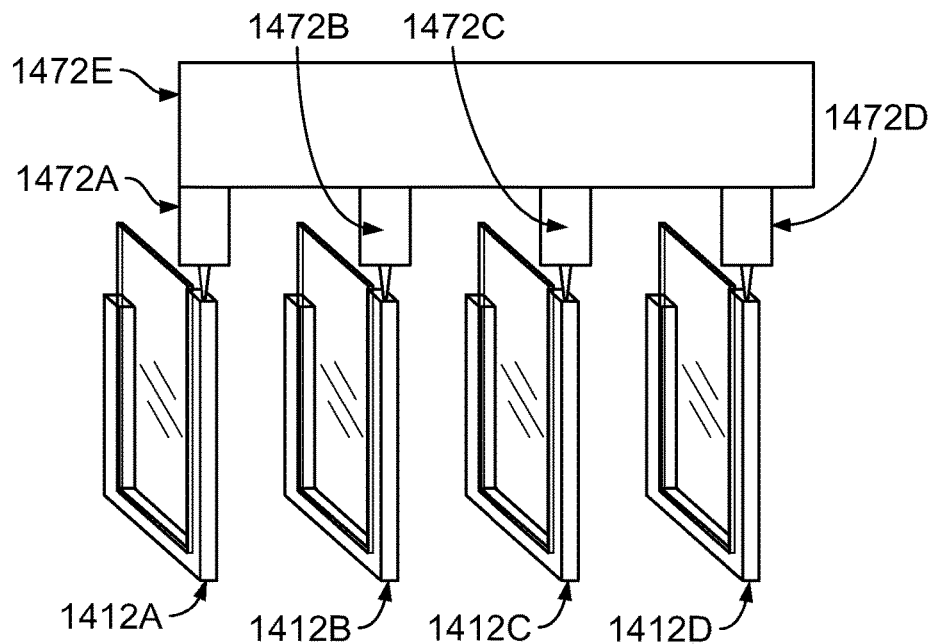
FIG. 25 is a diagrammatic view of a method and apparatus for forming a plurality of window assemblies in accordance with an alternative embodiment of the present disclosure.

FIG. 25 shows a plurality of window frames 1412A-1412D being printed simultaneously by a plurality of 3D print heads 1472A-1472D. The print heads 1472A-1472D may be attached to a common base 1472E, that is moved under computer control. In this manner, multiple window frames 1412A-1412D may be printed simultaneously, reducing the time for production in a manufacturing environment.

Figure 26:
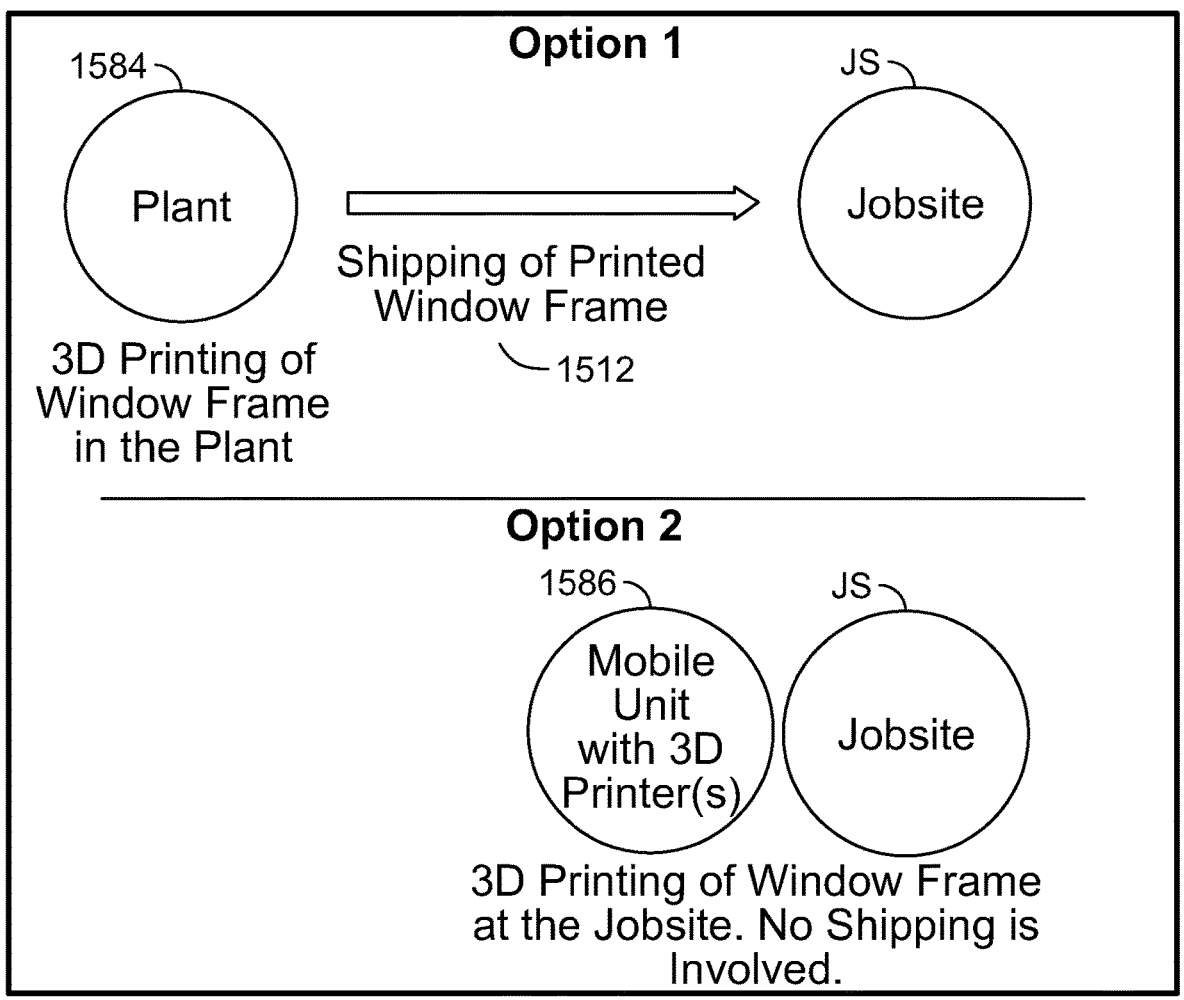
FIG. 26 is a diagrammatic view of a method and apparatus for forming architectural manufactures in accordance with an alternative embodiment of the present disclosure.

FIG. 26 diagrammatically shows that the 3D additive manufacturing of architectural products, like windows 1512, doors or other manufactures may be conducted in a manufacturing facility (plant) 1584 distant from a jobsite JS or in a mobile manufacturing facility 1586 positioned proximate a jobsite JS. Since the specifications of the manufacture 1512 may be digitally determined, e.g., by a scanner at a jobsite JS, additive manufacture enables a virtual presence at the jobsite JS. This virtual presence enables manufactures 1512 to be made with a high degree of certainty as to fit and function, such that the manufacture 1512 may be shipped from the manufacturing facility 1584 to the jobsite JS with a high degree of confidence in the suitability of the manufacture. Notwithstanding, as shown in FIG. 27, a mobile additive manufacturing unit 1586 installed in a container, on the bed of a truck trailer, or in the back of a box truck may be used to transport 3D manufacturing capability to a job site JS to facilitate manufacture and installation of architectural products for a building B at the jobsite JS. A mobile 3D manufacturing unit 1586 at a job site JS can reduce transportation requirements of architectural manufactures, in that raw materials in the form of plastic pellets, metal powder or the like is compact and typically doesn't require careful handling. The 3D manufactured items 1512 however, typically have carefully formed shapes, a greatly decreased density and increased dimensions, such that they require careful handling and are difficult to pack and ship. A mobile unit 1586 can print the architectural manufactures, e.g., window frames 1512, at the jobsite JS, eliminating the need for shipping, packaging, potential breakage and liability costs. Placing a mobile additive manufacturing (3D printing) unit 1586 at the jobsite JS allows for customization and reduction in manufacturing errors, in that a first manufactured architectural unit, e.g., a window 1512, can be made on-site and immediately placed on the building B to ascertain fit and function. In the event a design change is required, the digital specification guiding the additive manufacturing/3D printing process can be changed to eliminate any fit and function problems in subsequently generated units.

FIGS. 28 and 29 show a building B with window apertures WA in which window frames/window units 1612 are printed on-site. More specifically, printing unit 1672 is placed within a window aperture WA and prints the window frame/window 1612 directly in the aperture WA, i.e., directly on the brick, block, steel beams, wooden beams, etc. that form the structure of the building B and define the window apertures WA. In this manner, the printed window frame/window 1612 is assured close fidelity and complementarity with the window aperture WA, leading to a weather-proof fit of the window frame/window 1612.

Figure 30:
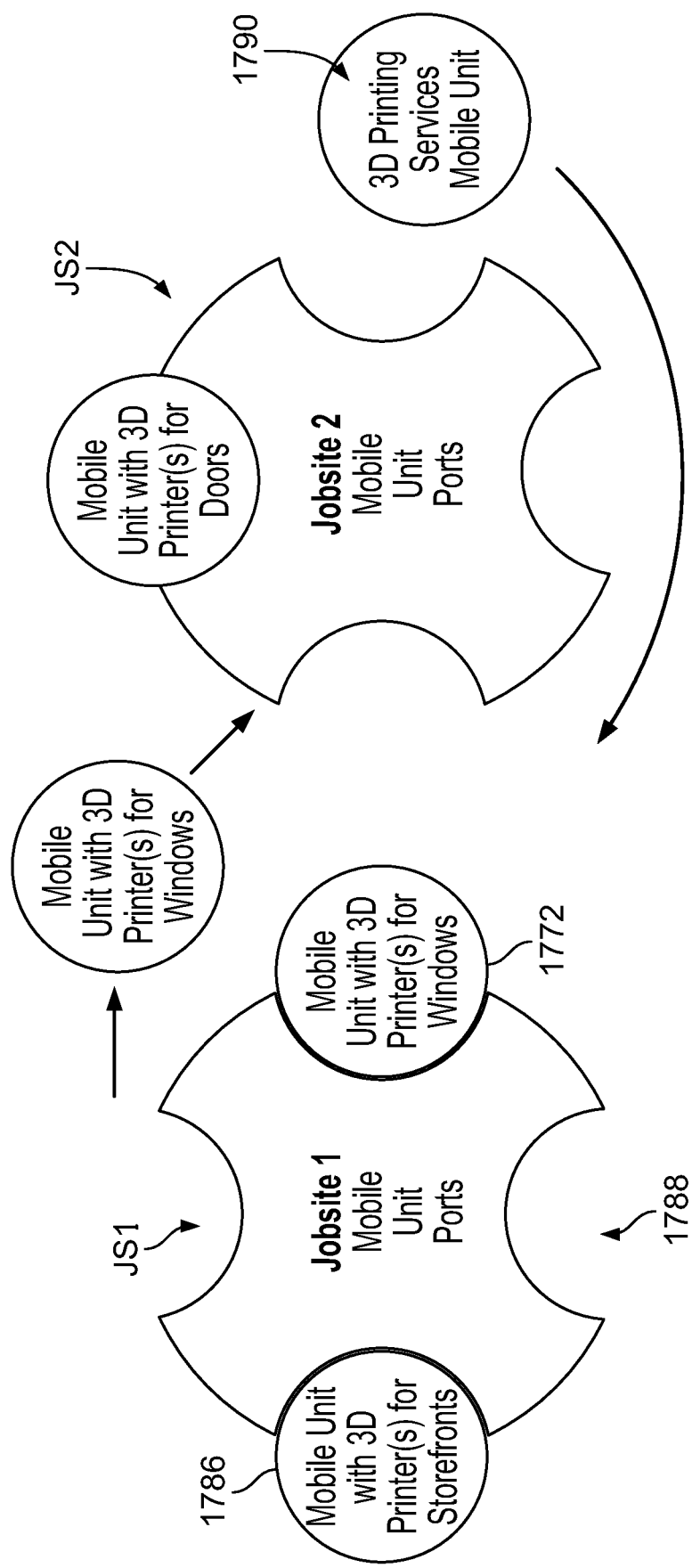
FIG. 30 is a diagrammatic view of a system conducting additive manufacturing at a plurality of jobsites in accordance with an alternative embodiment of the present disclosure.

FIG. 30 shows a system 1788 for providing mobile additive/3D manufacturing units 1786 (like mobile unit 1586 of FIG. 27) and/or 1772 (like mobile unit 1672 of FIG. 29) to multiple jobsites JS1 and JS2. As shown, the system 1788 and the 3D manufacturing process allows mobility and a variety of manufactures/products, e.g., 1312, 1412, 1512, 1612 to be printed at a plurality of jobsites JS1, JS2, etc. Mobile units dedicated to printing specific manufacturing line products (windows, doors, storefronts) can travel between jobsites JS1, JS2, and thus embody a manufacturing-on-demand system. A manufacturer may have a fleet of additive mobile units out on the field and traveling between jobsites to fulfill contractor/customer demands. Optionally, 3D printing services mobile units 1790 may be deployed to repair broken 3D printers at the job site JS1, JS2 and can travel between job sites JS1, JS2.

FIG. 31 shows a cross-section of a bead or ribbon 1802 of printed material diagrammatically, such as a thermo plastic extruded from a printing head like 172 A of FIG. 4. The shape and dimensions of the bead 1802 will depend upon the shape and dimensions of the print head orifice (not shown) and may have a variety of shapes and dimensions. In the example shown, the beads may have a width of, e.g., 0.34 inch and a height of 0.15 inch. The length (not shown) of the bead 1802 may be any selected length, e.g., 60 inches or the length of a given architectural manufacture, such as a window or window frame.

FIG. 32 is a cross-sectional, diagrammatic view of a printed body 1804 made from a plurality of beads 1802 of printed material. As in many forms of additive manufacture, printed/extruded/melted elements/pixels/beads are applied in flowable form to a support surface and then on top of one another, adhering to one another due to material adhesion, welding or other surface attraction. The extruded material may be applied in an elongated bead or ribbon that is dispensed from a print head that is moved as the bead is dispensed or the bead may be extruded upon a moving supporting structure, e.g., a table, that moves under the print head during extrusion to receive an elongated, continuous bead/ribbon of extrudate of a given length. In the example shown, the beads 1802 may have, e.g., a width of 0.34 inch and a height of 0.15 inch and on the right side are stacked vertically in stacks 1806 twenty three deep, resulting in a height of 3.45 inches total. The horizontal dimension of the printed body 1802, e.g., 1.70 inches is similarly a consequence of the number of stacks (five) in the horizontal direction and the width 0.34 inches of each bead 1804. As a result, the finished cross-sectional dimensions resulting from printing beads 1802 is initially determined by the dimensions of the beads and a given dimensional objective must be reconciled to the dimensions resulting from multiples of the bead dimensions in the vertical and horizontal directions. The same may be said of hollows 1808 or discontinuities in the stacks 1806. FIG. 32 also illustrates design dimension lines 1810, 1812 marking the design height, e.g., 3.40 inches (0.05 inches less than the stack height) and design width, e.g., 1.750 inches (0.05 inches greater than the width of the stack), respectively. The hollow 1808 is also marked with a design line 1814, which makes the hollow 1808 larger than the result of the stack 1806 dimensions. In addition to dimensional considerations, the spaces 1816 between adjacent beads 1802, either internal or external to the printed body 1804, may provide a reason for post processing. For example, external spaces 1816 will result in an external surface of the body 1804 that is not smooth, such that removal of material on the extensor surface of the body 1802 may be required in order to achieve a smooth exterior surface. Internal spaces 1816 represent a limit on surface area contact/adhesion between adjacent beads 1802 implying less than optimal strength for a given number of beads 1802. Post-processing steps, such as compression to deform the beads 1802 and press them into closer contact may be utilized to reduce internal spaces 1816. In another approach, the location of bead 1802 printing may be shifted in successive rows, such an over-printed row of beads 1802 may be shifted relative to the row of beads 1802 upon which it is printed to reduce the volume of the intra-bead spaces 1816.

FIG. 33 shows a printed body 1820 having the design dimensions shown in FIG. 32. Given a printed body 1804 of FIG. 32, it may be post processed after cure, e.g., by machining one of more exterior surfaces, to remove material, e.g., by a milling machine, a planer, a sander or other material removing device, e.g., to reduce 0.05 inches from the body 1804 height to reach the height of 3.40 inches and to improve surface smoothness. In another alternative, the printed beads 1802 may be compressed downwardly by a press or stamper to reduce their height and add to their width prior to curing. This compression may be conducted upon the entire body 1804 to distort those beads which are still compressible or after the deposition of a row of beads 1804 and may result in reducing the volume of internal inter-bead spacing. These post-printing steps may therefore by employed to achieve a given design dimension for the printed body. As can be appreciated, the compression of the body 1804 may be conducted in any direction to achieve a displacement in the perpendicular direction. As another alternative, a bead dimension may be tailored, e.g., by selecting a print orifice shape and dimensions that produce that that in multiples achieve a given dimensional target.

Figure 34:
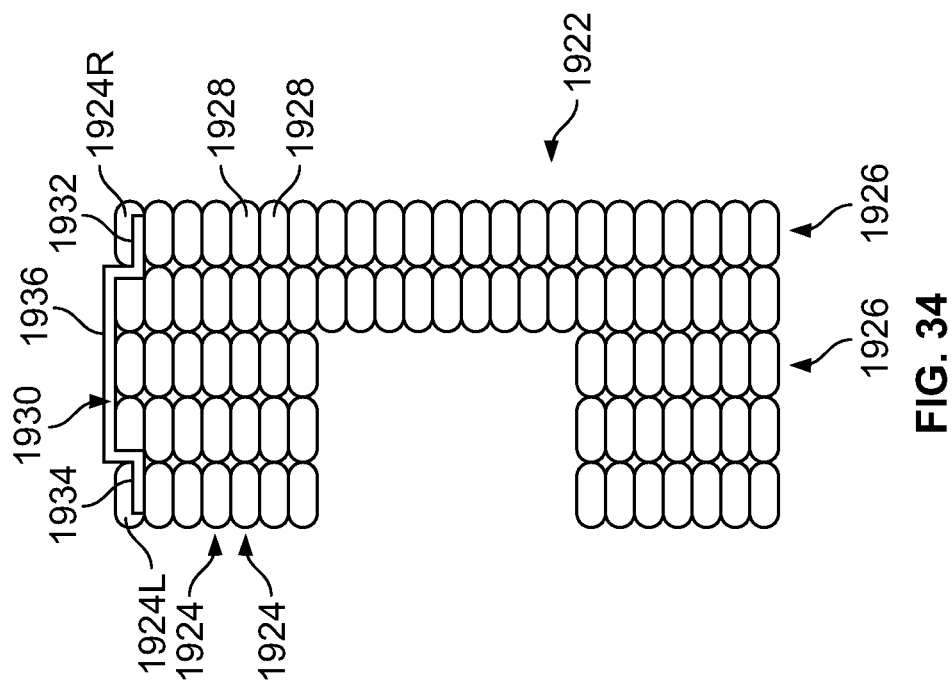
FIG. 34 is a cross-sectional view of a groups of beads of printed material forming a printed body with an imbedded façade in accordance with an alternative embodiment of the present disclosure.

FIG. 34 shows a printed body 1922 made from a plurality of horizontal rows 1924 and vertical columns 1926 of beads 1928 of printed material. A façade 1930, e.g., made from metal, such as an aluminum extrusion, is imbedded in the body 1922. A pair of downwardly extending extensions 1932, 1934 extend from an upper surfacing plate 1936 and are overprinted by retainer beads 1924R, 1924L that, when cured, adhere to the beads 1924 below them to retain the façade 1930 in association with the remainder of the body 1922.

Figure 35:
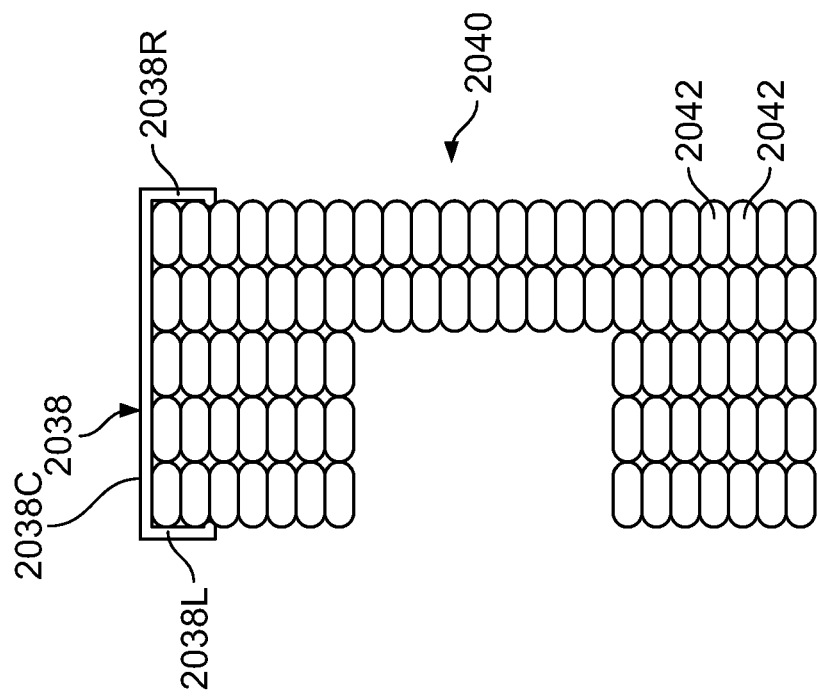
FIG. 35 is a cross-sectional view of a groups of beads of printed material forming a printed body with a clip-on façade in accordance with an alternative embodiment of the present disclosure.

FIG. 35 shows a clip-on façade 2038 with a central portion 2038C and right and left legs 2038R, 2038L, respectively, that embrace retain the façade 2038 to the printed body 2040 made from a plurality of printed beads 2042.

FIG. 36 shows a traditional, flat, printed window 2100 having straight length and width dimensions, i.e., in two dimensions width W and length L. Of course, the window has a thickness dimension that extends perpendicularly to the length L and width W that is generally constant. The printed window 2100 may be made in accordance with the techniques and apparatus described above, e.g., as described relative to FIGS. 4-6.

FIG. 37 shows a curved, printed window 2200 wherein the window frame 2210 and glazing panel 2212 bulge outwardly in the depth direction in traversing the width and FIG. 38 shows an angled window unit 2300 having a monolithic frame 2301 printed by additive manufacturing techniques, as described above. The frame 2301 has a firs side 2302 disposed at an angle A relative to a second side 2304. The glazing surfaces 2306 and 2308 may be made from a single piece of material, such as glass or plastic, e.g., polycarbonate, that is bent at the angle A or two pieces joined at their conjunction by a sealant.

FIG. 39 shows a curved, printed window 2200 like that of FIG. 37 installed into a window opening O between diverging walls W1, W2 of a structure.

FIG. 40 shows an angular printed window 2300 like that of FIG. 38 installed into an opening o between diverging walls W1, W2 of a structure.

FIGS. 41-44 show a compound window structure 2400 having multiple glazing panels 2402A, 2402B, 2402C, 2402D, 2402E, 2402F, 2402G, 2402H, with a pyramidal center structure 2404. The frame 2406 and all mullions 2408 may be formed monolithically by additive manufacturing techniques described above or may be formed by additively manufacturing methods in subunits and then assembled to form the window structure 2400. If the length and width of the window are considered to be disposed in the x and y directions, then the pyramidal structure 2404 extends in the z direction. The pyramidal structure 2404 defines a hollow space 2404S. In other embodiments, other hollow spaces may be defined by structures having other shapes, such as a triangular pyramid or a geodesic, vaulted or arched dome.

Figure 45:
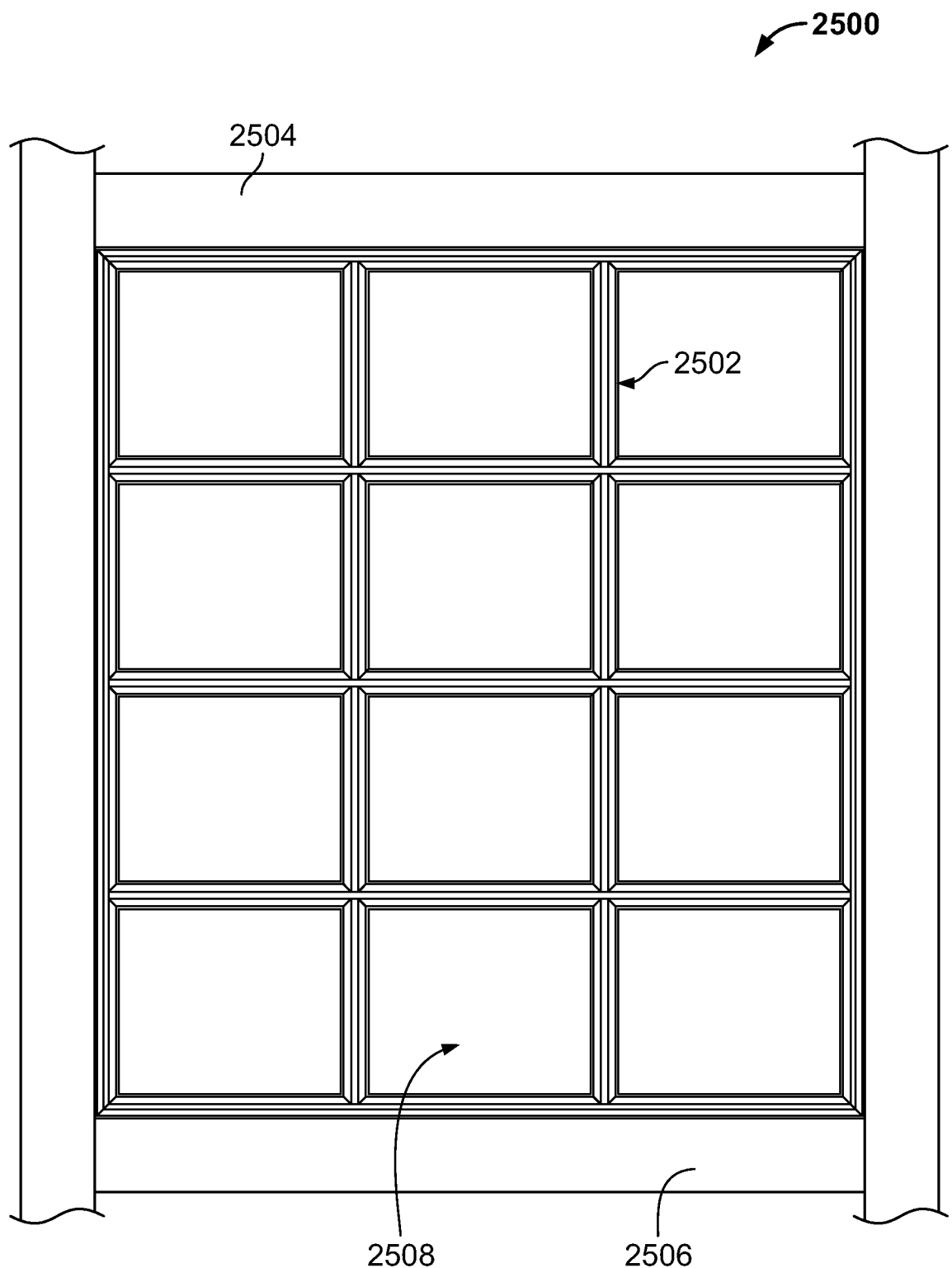
FIG. 45 is a front view of a window structure with muntins in accordance with an alternative embodiment of the present disclosure.
Figure 46:
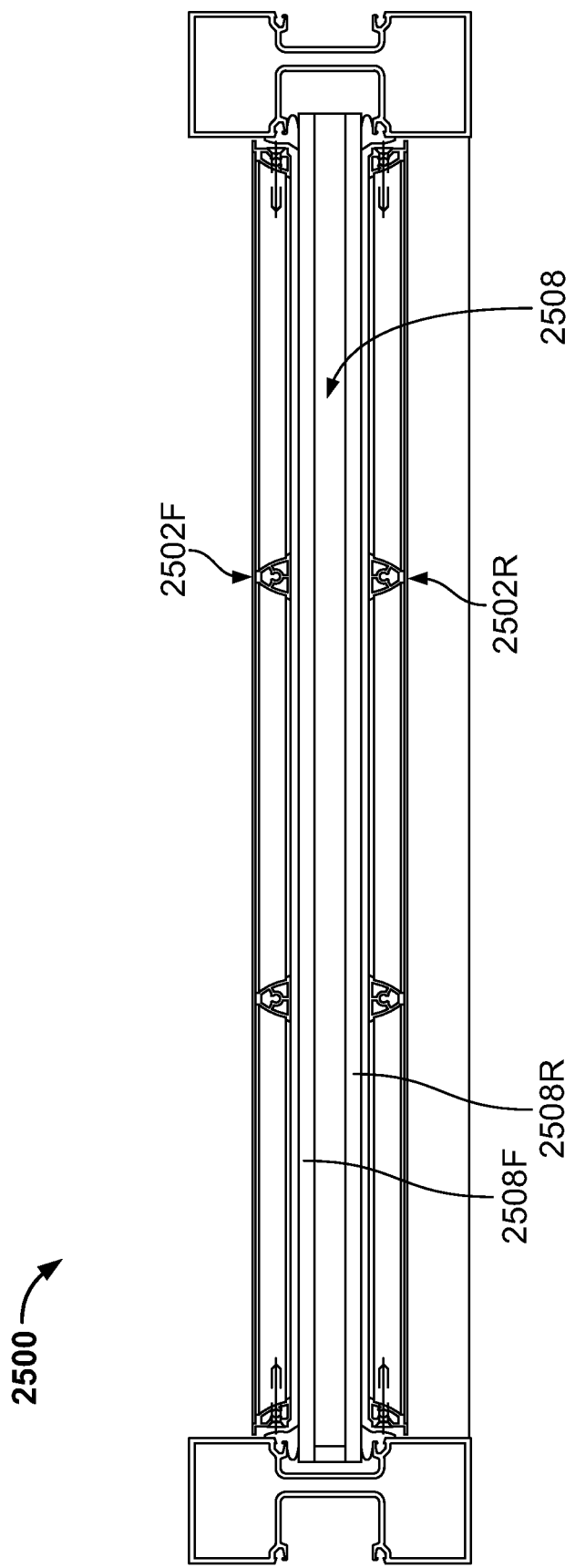
FIG. 46 is a cross-sectional view of the window of FIG. 45, taken along section line 46-46 and looking in the direction of the arrows.

FIGS. 45 and 46 show a window structure 2500 with a muntin grill 2502, which may be produced by additive manufacturing methods as described above. The muntin grill may be printed monolithically with other portions of the window 2500, e.g., sash elements 2504 and 2506. In one alternative, the glazing member 2508 may be placed in a recess formed in the sash members, e.g., 2504, 2506 and then the muntin grill is printed over the glazing panel 2508. In this instance, the glazing panel extends over the entire extent of the window unit 2500 and the muntins are decorative, rather than acting as pane dividers. In FIG. 46 the window unit 2500 features a muntin grill 2502F on the front of the window 2500 and a muntin grill 2502R on the rear of the window 2500. The glazing unit 2508 is double glazed, with a front portion 2508F and rear portion 2508R. An aspect of the present disclosure is that 3D printing of different materials may be conducted. The resolution of the printing may also be varied. A high resolution printed outer layer may be applied on top of prior layers to cover the prior layers and provide a given exterior coating of a selected material/color and texture for sealing/aesthetic purposes. In one example a printed window may be provided with an exterior surface of high resolution printed material simulating a wood grain pattern or another selected textural pattern. In this respect, the overprinting of an exterior layer may be used to achieve a selected external appearance, including making a smooth surface to cover exterior spacing 1816 (FIG. 32).

Figure 47:
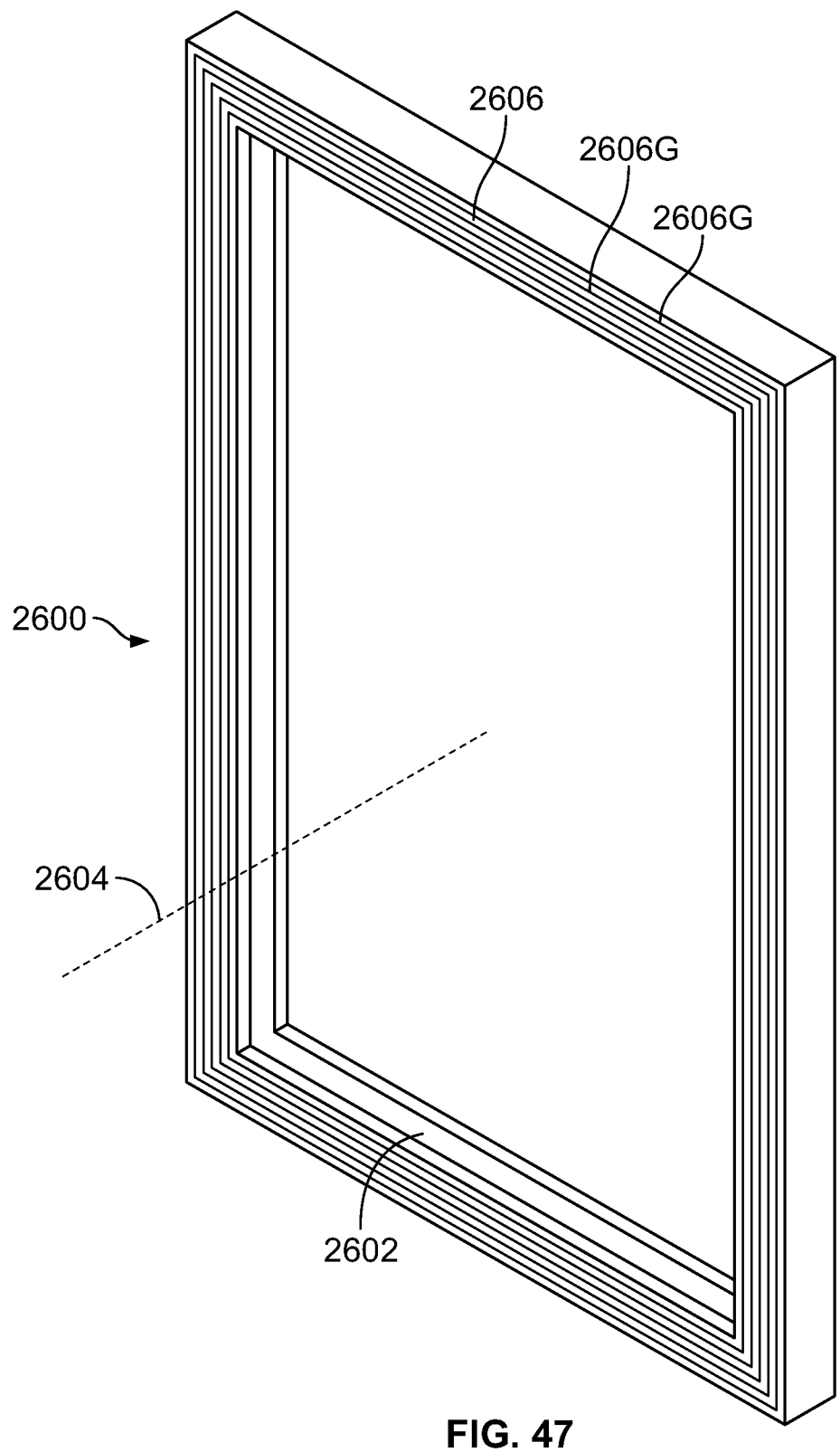
FIG. 47 is a perspective view of a window in accordance with an alternative embodiment of the present disclosure.

FIG. 47 shows a window frame/sash 2600 formed monolithically by additive manufacturing techniques as described above. The window frame 2600 may be made from a thermoplastic polymer, such as ABS dispensed in ribbons/beads at a temperature of approximately 221° F. The window frame 2600 has an interior recess 2602 to accommodate a glazing panel 2604, which is not present in this view, as indicated by the dotted reference line. The glazing panel 2604 could be glass, plastic or composite, e.g., made from multiple panels with a vacuum or gas there between and would be placed in the recess 2602 while it is open and prior to completion of the window 2600. For example, half the thickness of the window frame 2600 could be printed defining half of the depth of the recess 2602, the glazing panel 2604 may then be placed in the partially completed recess 2602 and then the remainder of the window frame 2600 printed, capturing the glazing panel 2604 in the recess 2602. Sealants or gaskets may be placed or printed in the recess to seal the glazing panel 2604/frame 2600 interface from weather intrusion. The window 2600 has a textured outer surface 2606, having a lined effect with a plurality of parallel grooves 2606G. If desired, the window frame 2600 may be coated with a pigmented material to provide to provide a selected color, pattern or other aesthetic effect.

It will be understood that the embodiments described herein are merely exemplary and that a person skilled in the art may make many variations and modifications without departing from the spirit and scope of the claimed subject matter. For example, while the present disclosure has been described in reference to the manufacture of windows and doors, the teachings of the present disclosure could be applied to other architectural elements, such as columns, arches, and other structures employed in establishing and maintaining a building envelope, such as skylights and fixed window systems. Window shading devices and light shelves may be printed in conjunction with windows and doors or independently. The present disclosure contemplates the additive manufacture/3D printing of what are now considered hardware elements, such as window handles, hinges, locks and other elements that are now separately manufactured and assembled to architectural manufactures, such as windows and doors. In accordance with the present disclosure, these elements can be printed either simultaneously or independently from the associated architectural product, e.g., a window or door. The present disclosure may be used to enable the manufacture of custom designed façade elements (windows, doors, etc.) using additive manufacturing/3D printing for any given application. Architectural manufactures made in accordance with the additive manufacturing techniques of the present disclosure may be made in a variety of shapes, e.g., frames may be made with circular and oval shapes. The joining lines and elements previously required by prior art techniques of architectural product manufacture are not necessary in the additively manufactured architectural products of the present disclosure. It should be appreciated that the internal hollows within architectural manufactures made by additive manufacturing techniques in accordance with the present disclosure may be used as warming/cooling channels and for water circulation. The additive manufacture of architectural products in accordance with the present disclosure may also be used to include energy harvesting elements, e.g., printed solar cells in the manufactures, e.g., windows and doors.

The present disclosure reveals a novel manufacturing technology that allows manufacture of high performance windows via simple, economic and ecological manufacturing processes. The present disclosure recognizes that the manufacture of architectural products may be done via additive processes in contrast to the more traditional subtractive manufacturing techniques of cutting, drilling, joining, etc. The additive manufacturing (AM) processes contemplated by the present application include 3D printing, selective laser sintering (SLS), selective laser melting (SLM), Direct Metal Laser Sintering (DMLS), Electron Beam Melting (EBM), Continuous Liquid Interface Production (CLIP), Selective Heat Sintering (SHS), Directed Energy Deposition, Electron Beam Freeform Fabrication (EBF), and Stereolithography (SLA).

All such variations and modifications are intended to be included within the scope of the disclosure.

The invention claimed is:

1. An architectural manufacture, comprising:
a plurality of spatially distributed deposits of material connected one to another to form the architectural manufacture, wherein the architectural manufacture is a frame for at least one of a window or a door, the window or door capable of at least partially covering an opening in a structure, wherein the window or door comprises stiles and rails, the deposits deposited in a flowable state at a plurality of 3D coordinates as controlled by a computer based upon design data, wherein, the deposits harden from the flowable state, thereby at least partially defining the architectural manufacture,
wherein the architectural manufacture includes a corner module with a male portion capable of inserting into an extruded member to form the frame,
wherein the male portion comprises a first male portion and a second male portion extending from the corner module at an angle relative to a direction of extension of the first male portion, the second male portion insertable into another extruded member to form the frame.

2. The manufacture of claim 1, wherein the deposits are in the form of least one of dots, lines or ribbons.

3. The manufacture of claim 1, wherein the architectural manufacture is a one-piece monolith.

4. The manufacture of claim 1, wherein the deposits are spatially distributed to form areas of greater and lesser mechanical strength.

5. The manufacture of claim 4, wherein the areas of greater mechanical strength have thicker or denser structural walls.

6. The manufacture of claim 4, wherein the areas of greater mechanical strength have a rib on a surface thereof.

7. The manufacture of claim 6, wherein the rib is internal to the manufacture.

8. The manufacture of claim 6, wherein the manufacture has a corner and the rib is at the corner.

9. The manufacture of claim 1, wherein the manufacture has hollows therein.

10. The manufacture of claim 9, wherein the hollows are defined by exterior members and internal members.

11. The manufacture of claim 10, wherein the exterior members include a plurality of exterior walls and the internal members include a network of structural elements.

12. The manufacture of claim 10, wherein the network of structural elements includes a plurality of pyramids.

13. The manufacture of claim 1, wherein the manufacture has a plurality of internal hollow cells.

14. The manufacture of claim 1, wherein the architectural manufacture is composite, having a plurality of different materials for forming associated sub-portions.

15. The manufacture of claim 14, wherein the different materials have different thermal properties.

16. The manufacture of claim 14, wherein the different materials have different mechanical properties.

17. The manufacture of claim 14, wherein at least one sub-portion is made of a metal and at least one sub-portion is made of plastic.

18. The manufacture of claim 14, wherein at least one sub-portion is not made by additive manufacturing.

19. The manufacture of claim 18, wherein at least one sub-portion is an extrusion.

20. The manufacture of claim 14, wherein a first portion is an outer cladding on a second portion.

21. The manufacture of claim 20, wherein the outer cladding is a clip-on cap.

22. The manufacture of claim 20, wherein the outer cladding is a cap with a portion thereof imbedded in the second portion.

23. The manufacture of claim 14, wherein a first portion is an interior reinforcement structure.

24. The manufacture of claim 23, wherein the interior reinforcement structure is at least one of a spine, a beam, or a grid.

25. The manufacture of claim 23, wherein a second portion includes a foam material.

26. The manufacture of claim 14, further comprising an adhesive to join a first sub-portion to a second sub-portion.

27. The manufacture of claim 1, wherein the architectural manufacture is an entire window assembly.

28. The manufacture of claim 27, wherein the window assembly includes hardware elements.

29. The manufacture of claim 28, wherein the hardware elements include a metal plate.

30. The manufacture of claim 28, wherein the hardware elements include at least one of a lock, handle or a hinge.

31. The manufacture of claim 1, wherein the frame surrounds a glazing panel.

32. The manufacture of claim 31, wherein the frame has a monolithically formed first sub-portion with a recess for receiving the glazing panel and a second portion extending over the glazing panel and attached to the first portion capturing the glazing panel there between.

33. The manufacture of claim 1, wherein the frame has at least one of integral glass setting blocks or integral anchoring clips.

34. The manufacture of claim 1, wherein the window is curved or angled.

35. The manufacture of claim 1, wherein the window defines a hollow three dimensional space.

36. The manufacture of claim 1, wherein the window includes at least one of a muntin, panning or trim.

37. The manufacture of claim 1, wherein a surface texture of the manufacture simulates wood grain.

38. The manufacture of claim 1, wherein an exterior surface of the manufacture is coated.

39. The manufacture of claim 1, wherein the architectural manufacture is asymmetrical.

\* \* \* \* \*